United States Patent
Gibson et al.

(10) Patent No.: US 10,395,199 B1
(45) Date of Patent: Aug. 27, 2019

(54) METHOD AND SYSTEM FOR ATM CASH SERVICING AND OPTIMIZATION

(71) Applicant: JPMorgan Chase Bank, N.A., New York, NY (US)

(72) Inventors: Donovan Gibson, Lewis Center, OH (US); James Gearheart, Delaware, OH (US); Matthew Bates, Lewis Center, OH (US); Jacob Andrew Naylor, Superior, CO (US)

(73) Assignee: JPMorgan Chase Bank, N.A., New York, NY (US)

( * ) Notice: Subject to any disclaimer, the term of this patent is extended or adjusted under 35 U.S.C. 154(b) by 694 days.

(21) Appl. No.: 14/516,898

(22) Filed: Oct. 17, 2014

(51) Int. Cl.
  *G06Q 10/00* (2012.01)
  *G06Q 10/06* (2012.01)
  *G06Q 20/18* (2012.01)
  *G06Q 10/04* (2012.01)

(52) U.S. Cl.
  CPC ....... *G06Q 10/06315* (2013.01); *G06Q 10/04* (2013.01); *G06Q 20/18* (2013.01)

(58) Field of Classification Search
  CPC ... G06Q 10/06315; G06Q 10/04; G06Q 20/18
  USPC ....................................................... 705/7.25
  See application file for complete search history.

(56) References Cited

U.S. PATENT DOCUMENTS

| | | | |
|---|---|---|---|
| 4,319,336 A | 3/1982 | Anderson et al. | |
| 4,321,672 A | 3/1982 | Braun et al. | |
| 4,617,457 A | 10/1986 | Granzow et al. | |
| 4,634,845 A | 1/1987 | Hale et al. | |
| 5,513,117 A | 4/1996 | Small | |
| 5,615,277 A | 3/1997 | Hoffman | |
| 5,659,165 A | 8/1997 | Jennings et al. | |
| 5,764,789 A | 6/1998 | Pare, Jr. et al. | |
| 5,799,288 A * | 8/1998 | Tanaka | G06Q 20/108 705/43 |
| 5,805,719 A | 9/1998 | Pare, Jr. et al. | |
| 5,825,003 A | 10/1998 | Jennings et al. | |
| 5,838,812 A | 11/1998 | Pare, Jr. et al. | |
| 5,870,724 A | 2/1999 | Lawlor et al. | |

(Continued)

OTHER PUBLICATIONS

ATM Manager Pro User's Manual, Dec. 15, 2000.*

*Primary Examiner* — William S Brockington, III
*Assistant Examiner* — Hector Leal
(74) *Attorney, Agent, or Firm* — Hunton Andrews Kurth LLP

(57) ABSTRACT

According to an embodiment of the present invention, a computer implemented method and system for determining an optimization schedule comprising: executing, via the computer processor, a volume forecast determination for at least one ATM device to generate forecast data, wherein the volume forecast comprises a withdrawal forecast and a deposit forecast; executing, via the computer processor, a simulation based on the forecast data to develop a set of possible schedules for the at least one ATM, wherein the simulation considers one or more identified uncertainties; automatically, via the computer processor, generating one or more fault risks based at least in part on the one or more identified uncertainties; and automatically, via the computer processor, determining an optimal schedule for the at least one ATM device based on the one or more fault risks.

16 Claims, 16 Drawing Sheets

(56) References Cited

U.S. PATENT DOCUMENTS

| | | | |
|---|---|---|---|
| 5,897,625 A | 4/1999 | Gustin et al. | |
| 5,963,647 A | 10/1999 | Downing et al. | |
| 6,045,039 A | 4/2000 | Stinson et al. | |
| 6,149,056 A | 11/2000 | Stinson et al. | |
| 6,202,054 B1 | 3/2001 | Lawlor et al. | |
| 6,554,185 B1 | 4/2003 | Montross et al. | |
| 6,659,259 B2 | 12/2003 | Knox et al. | |
| 6,796,490 B1 | 9/2004 | Drummond et al. | |
| 6,999,943 B1 | 2/2006 | Johnson et al. | |
| 7,025,256 B1 | 4/2006 | Drummond et al. | |
| 7,039,600 B1 | 5/2006 | Meek et al. | |
| 7,040,533 B1 | 5/2006 | Ramachandran | |
| 7,076,458 B2 | 7/2006 | Lawlor et al. | |
| 7,080,036 B1 | 7/2006 | Drummond et al. | |
| 7,150,393 B1 | 12/2006 | Drummond et al. | |
| 7,246,080 B2 * | 7/2007 | Feldman | G06Q 10/06 705/7.28 |
| 7,379,896 B1 | 5/2008 | Meek et al. | |
| 7,401,049 B2 | 7/2008 | Hobbs et al. | |
| 7,882,684 B2 | 2/2011 | Anzini et al. | |
| 7,946,474 B1 * | 5/2011 | Agrawal | G06Q 10/04 235/376 |
| 8,290,839 B1 * | 10/2012 | Houk | G06Q 40/00 705/35 |
| 2002/0082994 A1 * | 6/2002 | Herziger | G06Q 10/06 705/43 |
| 2002/0120572 A1 * | 8/2002 | Bellucci | G06Q 20/06 705/43 |
| 2002/0198803 A1 | 12/2002 | Rowe | |
| 2003/0040927 A1 | 2/2003 | Sato et al. | |
| 2003/0130940 A1 | 7/2003 | Hansen et al. | |
| 2003/0217005 A1 | 11/2003 | Drummond et al. | |
| 2004/0030622 A1 * | 2/2004 | Ramos | G06Q 10/08 705/35 |
| 2004/0215566 A1 * | 10/2004 | Meurer | G06Q 10/10 705/43 |
| 2005/0108072 A1 * | 5/2005 | Retsina | G06Q 10/04 705/7.37 |
| 2006/0065717 A1 * | 3/2006 | Hurwitz | G06Q 10/087 235/381 |
| 2006/0080254 A1 | 4/2006 | Chigira et al. | |
| 2009/0164250 A1 * | 6/2009 | Hamilton | G06Q 10/06393 705/3 |
| 2010/0174640 A1 | 7/2010 | Cole et al. | |
| 2010/0176460 A1 | 7/2010 | Goto et al. | |
| 2011/0184865 A1 | 7/2011 | Mon et al. | |
| 2011/0191242 A1 | 8/2011 | Allen | |
| 2011/0225087 A1 * | 9/2011 | Agrawal | G06Q 10/04 705/43 |
| 2012/0203591 A1 * | 8/2012 | Andoji | G06Q 10/04 705/7.28 |
| 2013/0134215 A1 | 5/2013 | Ramachandran et al. | |
| 2013/0159045 A1 * | 6/2013 | Ettl | G06Q 10/087 705/7.25 |
| 2014/0006090 A1 * | 1/2014 | Agrawal | G06Q 10/04 705/7.25 |
| 2014/0074708 A1 * | 3/2014 | Bellamy | G06Q 40/02 705/43 |
| 2015/0178670 A1 * | 6/2015 | Angus | G06Q 10/087 705/28 |

* cited by examiner

| V# Holiday/Special | V# Date of Month | V# Day of Month | V# Month of Year | V# Significant Volume Days |
|---|---|---|---|---|
| 1 New Years Day +1 -1 | 18 1st Day of Month | 49 Monday | 56 January | 68 1st Day of Month – Friday |
| 2 Martin Luther King Day | 19 2nd Day of Month | 50 Tuesday | 57 February | 69 1st Day of Month – Saturday |
| 3 Valentine's Day | 20 3rd Day of Month | 51 Wednesday | 58 March | 70 1st Day of Month – Sunday |
| 4 President's Day | 21 4th Day of Month | 52 Thursday | 59 April | 71 1st Day of Month – Monday |
| 5 Easter | 22 5th Day of Month | 53 Friday | 60 May | 72 1st Day of Month – Tuesday |
| 6 Mother's Day | 23 6th Day of Month | 54 Saturday | 61 June | 73 1st Day of Month – Wednesday |
| 7 Father's Day | 24 7th Day of Month | 55 Sunday | 62 July | 74 1st Day of Month – Thursday |
| 8 Memorial Day | 25 8th Day of Month | | 63 August | 75 15th Day of Month – Friday |
| 9 Independence Day | 26 9th Day of Month | | 64 September | 76 15th Day of Month – Saturday |
| 10 Labor Day | 27 10th Day of Month | | 65 October | 77 15th Day of Month – Sunday |
| 11 Columbus Day | 28 11th Day of Month | | 66 November | 78 15th Day of Month – Monday |
| 12 Halloween | 29 12th Day of Month | | 67 December | 79 15th Day of Month – Tuesday |
| 13 Veteran's Day | 30 13th Day of Month | | | 80 15th Day of Month – Wednesday |
| 14 Thanksgiving +1 -1 | 31 14th Day of Month | | | 81 15th Day of Month – Thursday |
| 15 Christmas +1 -1 | 32 15th Day of Month | | | 82 1st Workday of Month |
| 16 Election Day | 33 16th Day of Month | | | 83 Last Day of Month |
| 17 April 15th | 34 17th Day of Month | | | 84 Last Workday of Month |
| | 35 18th Day of Month | | | 85 1st Payday of Month |
| | 36 19th Day of Month | | | 86 2nd Payday of Month |
| | 37 20th Day of Month | | | 87 3rd Payday of Month |
| | 38 21st Day of Month | | | 88 4th Payday of Month |
| | 39 22nd Day of Month | | | 89 Last Day of Quarter |
| | 40 23rd Day of Month | | | 90 Last Workday of Quarter |
| | 41 24th Day of Month | | | |
| | 42 25th Day of Month | | | |
| | 43 26th Day of Month | | | |
| | 44 27th Day of Month | | | |
| | 45 28th Day of Month | | | |
| | 46 29th Day of Month | | | |
| | 47 30th Day of Month | | | |
| | 48 31st Day of Month | | | |

Figure 6

| | Replenishment Schedule | Faults/Yr | Service Frequency | Replenishment Schedule | |
|---|---|---|---|---|---|
| 1 | Sat | 5.6 | 2 | Thu Sat | 7.5 |
| 1 | Fri | 5.9 | 2 | Wed Sat | 6.5 |
| 1 | Thu | 6.1 | 2 | Wed Fri | 7.8 |
| 1 | Wed | 6.0 | 2 | Tue Sat | 7.2 |
| 1 | Tue | 5.6 | 2 | Tue Fri | 6.7 |
| 1 | Mon | 5.3 | 2 | Tue Thu | 8.4 |
| 1 | Sun | 5.3 | 2 | Tue Wed | 8.9 |
| 2 | Fri Sat | 2.2 | 2 | Mon Sat | 7.7 |
| 2 | Thu Sat | 0.0 | 2 | Mon Fri | 6.8 |
| 2 | Thu Fri | 2.4 | 2 | Mon Thu | 7.3 |
| 2 | Wed Sat | 0.0 | 2 | Mon Wed | 7.7 |
| 2 | Wed Fri | 0.1 | 2 | Mon Tue | 8.5 |
| 2 | Wed Thu | 2.7 | 2 | Sat Sun | 8.5 |
| 2 | Tue Sat | 0.3 | 2 | Fri Sun | 7.6 |
| 2 | Tue Fri | 0.0 | 2 | Wed Sun | 7.0 |
| 2 | Tue Thu | 0.7 | 2 | Tue Sun | 7.4 |
| 2 | Tue Wed | 2.2 | 3 | Thu Fri Sat | 7.4 |
| 2 | Mon Sat | 1.7 | 3 | Wed Fri Sat | 5.3 |
| 2 | Mon Fri | 0.0 | 3 | Tue Fri Sat | 2.7 |
| 2 | Mon Thu | 0.0 | 3 | Tue Thu Sat | 2.1 |
| 2 | Mon Wed | 1.6 | 3 | Tue Thu Fri | 6.0 |
| 2 | Mon Tue | 2.3 | 3 | Tue Wed Sat | 3.2 |
| 2 | Sat Sun | 2.5 | 3 | Tue Wed Fri | 6.0 |
| 2 | Fri Sun | 0.6 | 3 | Mon Fri Sat | 5.0 |
| 2 | Wed Sun | 0.2 | 3 | Mon Thu Sat | 1.4 |
| 2 | Tue Sun | 1.8 | 3 | Mon Thu Fri | 3.1 |
| 3 | Thu Fri Sat | 0.0 | 3 | Mon Wed Sat | 1.7 |
| 3 | Wed Fri Sat | 0.0 | 3 | Mon Wed Fri | 2.3 |
| 3 | Tue Fri Sat | 0.0 | 3 | Mon Wed Thu | 6.4 |
| 3 | Tue Thu Sat | 0.0 | 3 | Mon Tue Sat | 5.6 |
| 3 | Tue Thu Fri | 0.0 | 3 | Mon Tue Fri | 2.9 |
| 3 | Tue Wed Sat | 0.0 | 3 | Mon Tue Thu | 6.4 |
| 3 | Tue Wed Fri | 0.0 | 3 | Thu Sat Sun | 5.2 |
| 3 | Tue Wed Thu | 0.0 | 3 | Thu Fri Sun | 5.2 |
| 3 | Mon Fri Sat | 0.0 | 3 | Wed Sat Sun | 2.7 |
| 3 | Mon Thu Sat | 0.0 | 3 | Wed Fri Sun | 1.7 |
| 3 | Mon Thu Fri | 0.0 | 3 | Wed Thu Sun | 3.0 |
| 3 | Mon Wed Sat | 0.0 | 3 | Tue Sat Sun | 5.6 |
| 3 | Mon Wed Fri | 0.0 | 3 | Tue Fri Sun | 1.2 |
| 3 | Mon Wed Thu | 0.0 | 3 | Tue Thu Sun | 1.9 |
| 3 | Mon Tue Sat | 0.0 | 3 | Tue Wed Sun | 5.8 |
| 3 | Mon Tue Fri | 0.0 | 3 | Mon Sat Sun | 5.0 |
| 3 | Mon Tue Thu | 0.0 | 3 | Mon Thu Sun | 2.7 |
| 3 | Mon Tue Wed | 1.5 | 3 | Mon Wed Sun | 5.8 |
| 3 | Fri Sat Sun | 0.6 | 3 | Mon Tue Sun | 7.3 |

| Service Frequency | Deposit Schedule | Faults/Yr | Base Cost | Fault Cost | Total Cost |
|---|---|---|---|---|---|
| 2 | Thu Sat | 7.5 | $ 3,120 | $ 940 | $ 4,060 |
| 2 | Wed Sat | 6.5 | $ 3,120 | $ 828 | $ 3,938 |
| 2 | Wed Fri | 7.8 | $ 3,120 | $ 978 | $ 4,098 |
| 2 | Tue Sat | 7.2 | $ 3,120 | $ 902 | $ 4,022 |
| 2 | Tue Fri | 6.7 | $ 3,120 | $ 833 | $ 3,953 |
| 2 | Tue Thur | 8.4 | $ 3,120 | $ | $ |
| 2 | Tue Wed | 8.9 | $ 3,120 | $ 1,117 | $ 4,237 |
| 2 | Mon Sat | 7.7 | $ 3,120 | $ 960 | $ 4,080 |
| 2 | Mon Fri | 6.8 | $ 3,120 | $ 853 | $ 3,973 |
| 2 | Mon Thu | 7.3 | $ 3,120 | $ 912 | $ 4,032 |
| 2 | Mon Wed | 7.7 | $ 3,120 | $ 960 | $ 4,080 |
| 2 | Mon Tue | 8.5 | $ 3,120 | $ 1,058 | $ 4,178 |
| 2 | Sat Sun | 8.5 | $ 3,120 | $ 1,063 | $ 4,283 |
| 2 | Fri Sun | 7.6 | $ 3,120 | $ 954 | $ 4,074 |

1420 — Most Optimized but not possible with supply chain

X

1412

| Service Frequency | Replenishment Schedule | Fault/Yr | Base Cost | Fault Cost | Total Cost |
|---|---|---|---|---|---|
| 1 | Fri | 5.9 | $ 2,600 | $ 741 | $ 3,341 |
| 1 | Thu | 6.1 | $ 2,600 | $ 762 | $ 3,362 |
| 1 | Wed | 6.0 | $ 2,600 | $ 754 | $ 3,354 |
| 1 | Tue | 5.6 | $ 2,600 | $ 696 | $ 3,296 |
| 1 | Mon | 5.3 | $ 2,600 | $ 664 | $ 3,264 |
| 1 | Sat | 6.6 | $ 2,600 | $ 733 | $ 1,101 |
| 1 | Sun | 5.3 | $ 2,600 | $ 657 | $ 3,257 |
| 2 | Fri Sat | 2.2 | $ 5,200 | $ 275 | $ 5,475 |
| 2 | Thu Sat | 0.0 | $ 5,200 | $ 3 | $ 5,203 |
| 2 | Thu Fri | 2.4 | $ 5,200 | $ 295 | $ 5,495 |
| 2 | Wed Sat | 0.0 | $ 5,200 | $ - | $ 5,200 |
| 2 | Wed Fri | 0.1 | $ 5,200 | $ 12 | $ 5,212 |
| 2 | Wed Thu | 2.7 | $ 5,200 | $ 340 | $ 5,540 |
| 2 | Tue Sat | 0.3 | $ 5,200 | $ 40 | $ 5,240 |

1422 — Most Optimized independent of other services

1424 — Most Optimized ATM Schedule

=

1414

| Replenishment Schedule | Deposit Schedule | Discount | Total Cost |
|---|---|---|---|
| Tue | Mon Fri | $ - | $ 7,269 |
| Mon Wed | Thu Fri Sat | $ - | $ 11,000 |
| Mon | Mon Wed Sat | $ 1,248 | $ 6,909 |
| Sat | Sat Sun | $ 1,248 | $ 6,236 |
| Mon Fri | Mon Wed Fri | $ 2,496 | $ 7,677 |
| Sat | Tue Thu Sat | $ 1,248 | $ 6,997 |
| Mon Thu | Mon Thu Sun | $ 2,496 | $ 7,720 |
| Sat | Mon Wed Sat | $ 1,248 | $ 6,945 |
| Mon Fri | Mon Wed Fri Sat | $ 2,496 | $ 9,004 |
| Wed | Mon Thu | $ - | $ 7,385 |
| Thu | Tue Sat | $ - | $ 7,284 |
| Mon | Mon Fri | $ 1,248 | $ 5,990 |
| Mon Fri | Mon Fri | $ 2,496 | $ 6,679 |
| Tue Thu Sat | Tue Thu Sat Sun | $ 3,744 | $ 10,353 |
| Tue Fri | Mon Tue Thu Sat | $ 1,248 | $ 10,253 |
| Sat | Tue Thu | $ - | $ 7,475 |

METHOD AND SYSTEM FOR ATM CASH SERVICING AND OPTIMIZATION

FIELD OF THE INVENTION

The present invention relates generally to ATM optimization, and more specifically to a method and system for ATM servicing and optimization based on forecasting and model simulation.

BACKGROUND OF THE INVENTION

Use of the Automated Teller Machine (ATM) has grown exponentially over the past years due to its ease of use, increased functionality, proximity to high foot and vehicle traffic areas and customer adaptation to the technology. Customer adaptation and exponential growth in the ATM channel has placed high demands and very high customer expectations on ATM technology, ATM reliability and ATM cash.

Like branch banks, ATMs typically individually determine how much cash is needed to maintain the services that they provide to their customers. Oftentimes, vendors over compensate and as a result, ATMs tend to order substantially more cash than is needed. Such over-ordering puts more cash in inventory than is needed to service customers. The excessive inventory results in substantial costs that could be avoided. Likewise, ATMs may be stocked with much less cash than is needed. This can result in expensive expedited transfers of cash.

Other drawbacks are also present.

SUMMARY OF THE INVENTION

Accordingly, one aspect of the invention is to address one or more of the drawbacks set forth above. According to an embodiment of the present invention, a method for determining an optimization schedule comprises: executing, via the computer processor, a volume forecast determination for at least one ATM device to generate forecast data, wherein the volume forecast comprises a withdrawal forecast and a deposit forecast; executing, via the computer processor, a simulation based on the forecast data to develop a set of possible schedules for the at least one ATM, wherein the simulation considers one or more identified uncertainties; automatically, via the computer processor, generating one or more fault risks based at least in part on the one or more identified uncertainties; and automatically, via the computer processor, determining an optimal schedule for the at least one ATM device based on the one or more fault risks.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 6 is an exemplary illustration of predictor variables, according to an embodiment of the present invention.

FIGS. 12A-C is an exemplary illustration of a simulation output, according to an embodiment of the present invention.

FIG. 14 is an exemplary illustration of determining an optimum schedule, according to an embodiment of the present invention.

DETAILED DESCRIPTION OF EXEMPLARY EMBODIMENT(S)

An embodiment of the present invention is directed to ATM cash servicing, replenishment and optimization. Based on ATM volume patterns, an embodiment of the present invention determines an optimal vendor service schedule. The schedule reduces negative customer impacts due to out-of-cash events and deposit bin full events while reducing total vendor costs.

An embodiment of the present invention involves (1) Forecasting; (2) Scheduling and a (3) Business Rule Decision Engine. The Forecasting feature considers seasonable volume fluctuations, holiday volume fluctuations, ATM volume levels and also performs cleansing of outliers in an automated fashion. A volume forecast may be generated for each Vendor Serviced ATM and/or a group of ATMs. A regression model may be applied to a historic ATM volume to anticipate ATM volume changes. The historic volume may be based on daily volume or other volume based on another time span, interval, incident, and/or request. The Scheduling feature may implement an algorithm that creates various possible schedules, compares the possible schedules and then selects one or more optimal schedules. The algorithm may include a Monte Carlo simulation, for example. The Monte Carlo simulation incorporates the forecast results with other uncertain variables in the business environment to assess a "fault risk" for each Vendor Serviced ATM's candidate service schedules. Separate but similar processes may be used for withdrawals and deposits. Other probabilistic approaches may be used. The Business Rule Decision Engine establishes business rules and optimizes the service schedule based on various factors such as risk, business rules and/or cost containment. The system of an embodiment of the present invention may generate a recommended scheduled replenishment and deposit pull services to vendor serviced ATMs. The system of an embodiment of the present invention may also provide scheduling details, such as schedule frequency and day of the week. Other scheduling specifics may also be provided.

An embodiment of the present invention may optimize the vendor serviced ATM schedules resulting in substantial cost savings, carbon reduction realized from decreased vendor trips, and improved customer service events.

While the detailed description is directed to an exemplary application involving ATM schedules, the various embodiments of the invention may be applied to other scenarios and applications involving optimization and scheduling. For example, an embodiment of the present invention may be applied to other types of monetary replenishment, including cash registers, cash for merchants, bank branches, tolls and/or other financial service entity. Also, various features of an embodiment of the present invention may be applied to other applications, such as stock replenishment, vending machines, items with high turnaround and/or short shelf-life, etc. Other applications may be applied in varying scope.

Figure 1:
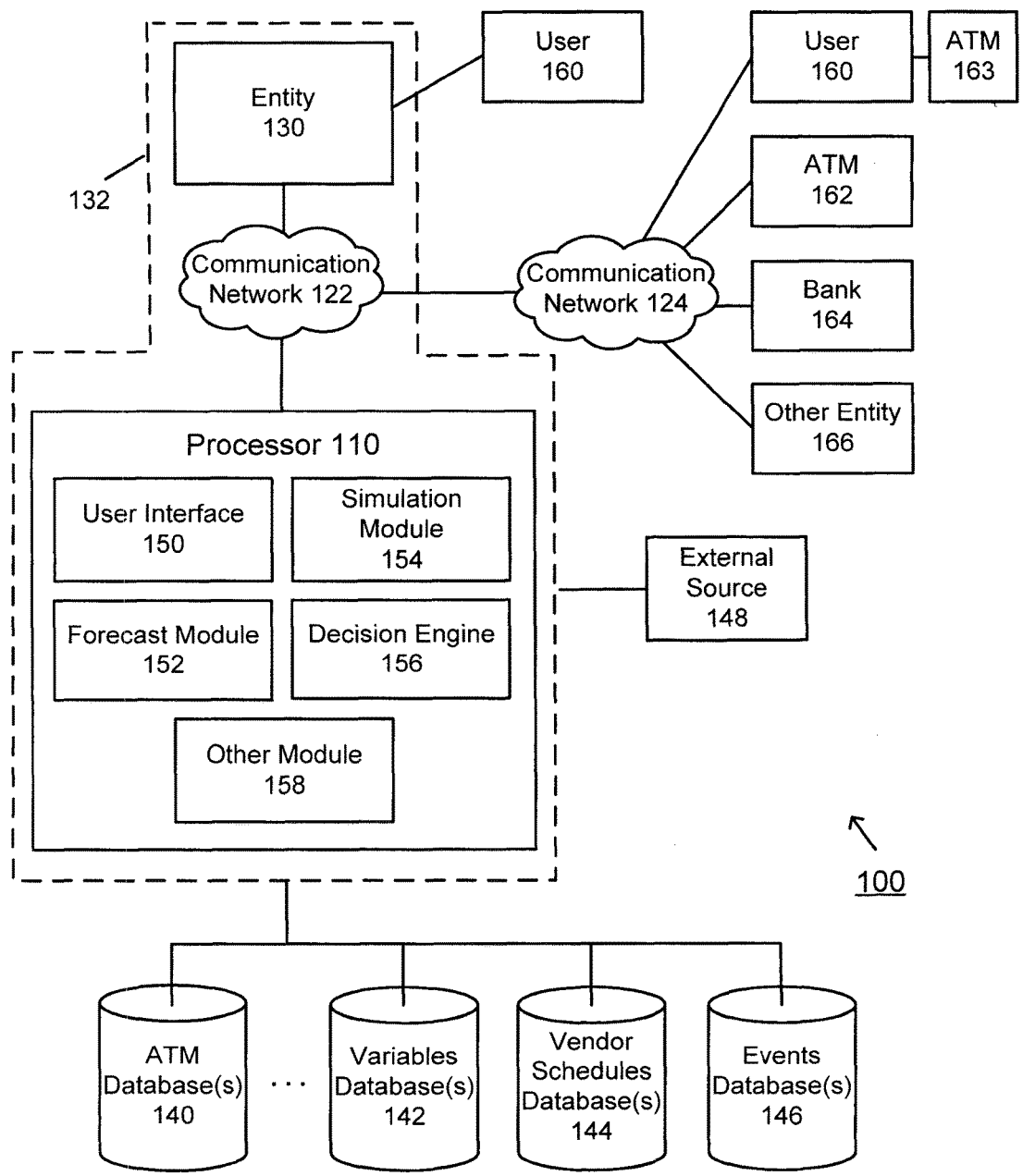
FIG. 1 is an exemplary diagram of a system for ATM servicing and optimization, according to an embodiment of the present invention.

FIG. 1 is an exemplary diagram of a system for ATM servicing and optimization, according to an embodiment of the present invention. A system 100 of an embodiment of the present invention may include a Processor 110, which may be stand alone, hosted by an entity, such as a financial institution, bank, company, corporation, service provider, contractor, merchant, etc. For example, Processor 110 may be affiliated or associated with a company, financial institution and/or other entity with scheduling and/or optimization concerns. In an exemplary embodiment involving an Entity, such as 130, the entity may host or support the Processor 110. In this example, the application of the various features of an embodiment of the present invention may appear to be performed by the entity, as a single consolidated unit, as shown by 132.

According to another example, Processor 110 may be separate and distinct from Entity 130. For example, Entity 130 may communicate to Processor 110 via a network or other communication mechanism. While a single illustrative block, module or component is shown, these illustrative blocks, modules or components may be multiplied for various applications or different application environments. hi addition, the modules or components may be further combined into a consolidated unit. Other architectures may be realized. The modules and/or components may be further duplicated, combined and/or separated across multiple systems at local and/or remote locations. Processor 110 may be accessed via a mobile device, tablet, phone and/or other device. Processor 110 may also reside on a remote device, at a remote location, client site, etc. Other architectures may be realized. The functionality discussed herein—in whole and/or in part—may be provided via a mobile application.

Processor 110 may access databases and/or other sources of information for data retrieval and processing, including forecasting, simulation and optimization. For example, Processor 110 may access and/or maintain Databases 140, 142, 144, 146. Database 140 may represent ATM database. ATM database may include historical information regarding ATM activity, such as daily withdrawals, daily deposits, and/or other activity. ATM database may also include ATM restrictions, characteristics, brand, location specifics, etc. For example, an ATM at an amusement park may have a different schedule than one located at an airport, busy street corner, etc. Some ATMs may have various restrictions on when they can be serviced. Database 142 may include unknown variables and factors. The variables may represent factors, such as vendor schedule uncertainties, deposit bin capacities, etc. Database 144 may represent vendor schedules, which may include driver information, routes, restrictions, vehicle information, etc. Database 146 may represent specifics concerning events, holidays, etc. that may affect ATM usage. Other external sources may be accessed, as represented by 148. Some examples may include weather factors, events of national security, power outages, security breaches, and/or other information that may affect ATM usage. While each database is illustrated as a single database in the exemplary figure, the system may include multiple databases at the same location or separated through multiple locations. The databases may be further combined and/or separated. In addition, the databases may be supported by Entity 130 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

A user may represent a client, such as a financial institution. The user may set base ATM schedules, request emergency services, communicate schedules to vendors, verify supplier compliance to schedules, performing billing and invoicing, etc.

Processor 110 may communicate with various entities, including User 160, ATM 162, Bank 164 and/or Other Entity 166. For example, optimization may be communicated to User 160, who can then implement each ATM accordingly. Also, the optimization may be provided to the ATM for automated implementation. ATM 162 may represent a single ATM, a group of ATMs at a location or across multiple locations. Optimization information may also be provided to a bank for implementation. Communication may be provided by Communication Network 122, 124 and/or other communication mechanism. In addition, Processor 110 may have access to other sources of data and/or data feeds that identify other metrics and/or information that may be relevant for optimization in accordance with an embodiment of the present invention. As shown, User 135 may communicate directly with Entity 130.

Processor 110 may include various modules and interfaces for scheduling and optimization, according to an embodiment of the present invention. Processor 110 may include User Interface 150, Forecast Module 152, Simulation Module 154, Decision Engine 156 and/or other modules, interfaces and/or processors, as represented by Other Module 158. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

An embodiment of the present invention is directed to an analytics driven method and system to realize business value, such as improving customer experience, mitigating risk and creating efficiencies. An embodiment of the present invention is directed to statistical analysis, forecasting, predictive modeling and optimization.

User Interface 150 represents a customizable user friendly front end interface. The information displayed may be based on the user's identity, roles, permissions, security level, etc. The user may further customize the information displayed by priority, notifications and/or other preferences. User preferences may be user defined and/or automatically applied.

According to another embodiment of the present invention, Processor 110 may host a website or other electronic interface or other input where users can access data as well as provide data. For example, a financial institution, service provider and/or other entity may access information through an interface to view data, submit requests, view reports, provide data and/or perform other actions. As discussed above, an application for a mobile device may be provided. For example, the processor may reside on a mobile device.

A bank may request an optimization schedule for one or more ATMs. The request may be performed in an automated manner and/or at the request of a user (e.g., branch, ATM manager, etc.)

Forecast Module 152 generates a forecast for withdrawal and deposits for an ATM. The forecasting may also be for a particular ATM, group of ATMs (e.g., ATMs located in a geographic area, block radius, street, etc.), similar ATMs (e.g., applying the forecast of a particular ATM to another similar ATM, etc.) or an ATM with a particular characteristic (e.g., an ATM in a city, an ATM is a suburb, etc.). The forecasting feature may be applied to withdrawals, as well as deposits. The forecasting feature may be based on historic ATM volume, as well as ATM activity in a similar area or another area with similar characteristics.

Other information may be tracked and forecasted. For example, the ATMs may obtain information regarding foot traffic, balance checks, individual ATM activity, ATM activity schedules, whether a line is formed, etc. Also, activity for non-account holders may be tracked. This information may be used for marketing and/or other purposes. An embodiment of the present invention may also track individual customers, such as user withdrawal activity (e.g., how much, when, frequency, which location, etc.), user deposit activity (e.g., how much, when, frequency, which location, etc.), user behavior (e.g., when, how often, etc.).

An embodiment of the present invention may apply a methodology, such as a stepwise linear regression, that generates a volume forecast for each Vendor Serviced ATM. According to an embodiment of the present invention, a predictive aspect of the model may be constructed on a regression model that draws on historic daily ATM volume. Other models may be applied.

Simulation Module 154 applies a simulation to the forecast data to develop possible schedules. An embodiment of the present invention involves a simulation, such as a Monte Carlo Simulation, that incorporates the forecast results with other uncertain variables in the business environment to assess a "fault risk" for each ATM's candidate service schedules. The forecast model anticipates ATM volume changes in the following months (or other time period). The Monte Carlo methodology may be considered appropriate for assessing risk in an environment with many uncertain variables. Other methodologies and simulations may be applied in accordance with the embodiments of the present invention.

Decision Engine 156 may identify one or more optimal schedules. For example, the decision engine may evaluate the service costs and/or fault risks of each candidate schedule and choose an optimum new schedule or multiple optimal schedules. The Decision Engine may be a selection tool for a business rule application.

Figure 2:
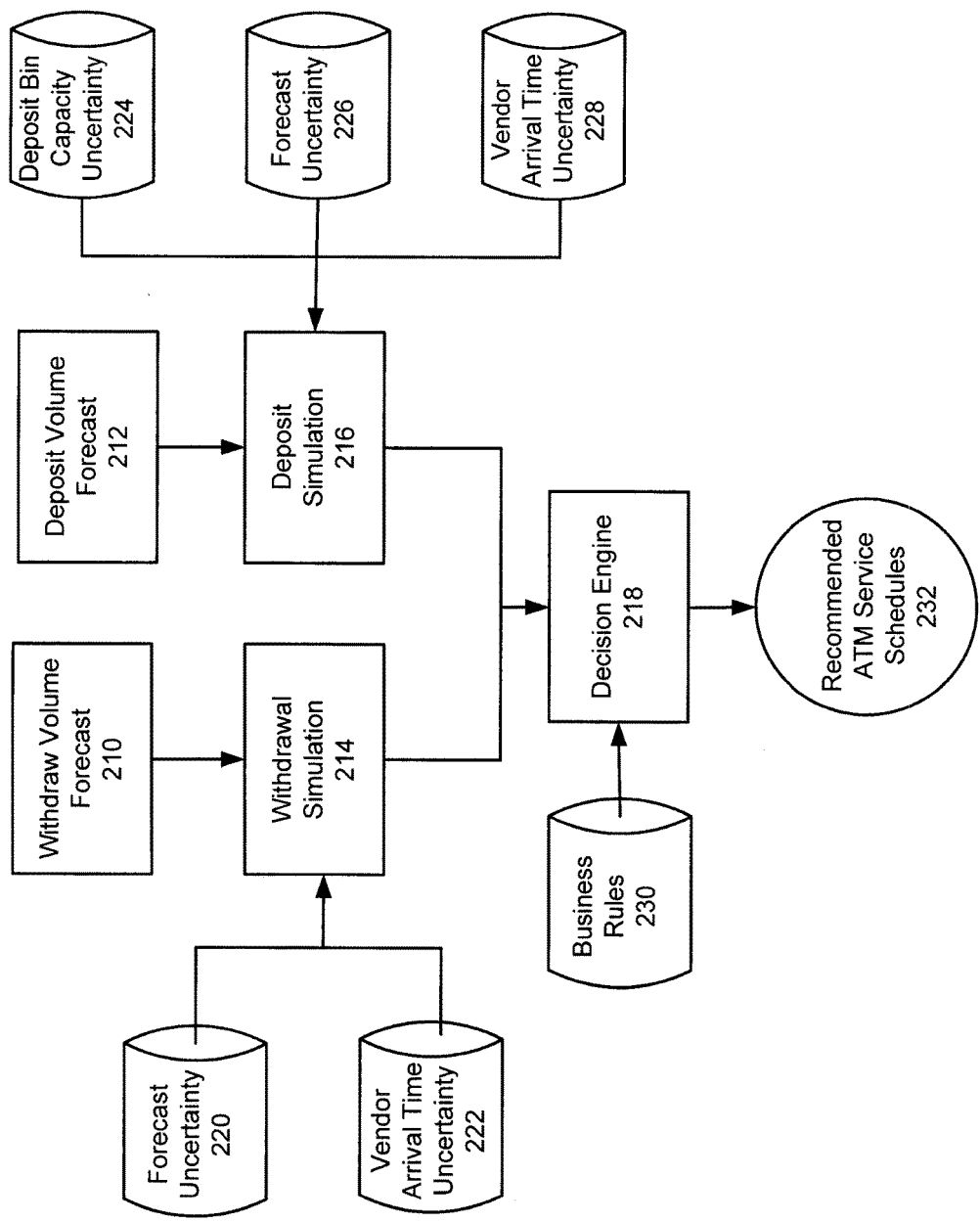
FIG. 2 is an exemplary diagram of a flowchart for ATM servicing and optimization, according to an embodiment of the present invention.

FIG. 2 is an exemplary diagram of a flowchart for ATM servicing and optimization, according to an embodiment of the present invention. An embodiment of the present invention involves forecasting, simulation and decisioning. Forecasting may include withdraw volume forecast 210 and deposit volume forecast 212. Simulation may include withdraw simulation 214 and deposit simulation 216. Withdraw simulation may receive inputs from forecast uncertainty 220 and vendor arrival time uncertainty 222. Other sources of uncertainty may be received and applied. Deposit Simulation 216 may receive inputs from deposit bin capacity uncertainty 224, forecast uncertainty 226 and vendor arrival time uncertainty 228. Other sources of uncertainty may be received and applied. Decision Engine 218 may receive business rules 230 and generate recommended ATM service schedules 232. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Forecasting may include withdraw volume forecast 210 and deposit volume forecast 212. ATM history data may be retrieved or otherwise accessed. For example, for an ATM, weekly patterns may indicate that the volume doubles every Friday. Monthly patterns may indicate that volume triples at the beginning of each month. Also, interactions between the patterns may reveal that the pattern changes based on what day of the week the first of the month lands on.

ATM level forecasting may be performed. For example, forecasts may be performed at the ATM level (e.g., by hour, by day, by event, by time period, etc.). Cash withdrawal and deposit forecasting may be separate and distinct methodologies.

FIG. 6 is an exemplary illustration of predictor variables, according to an embodiment of the present invention. In this example, there are 90 predictor variables that may be tested for correlation to volume shirts at an ATM. Variables 1-17 may represent holiday or special days. Variables 18-48 may represent each day of a month. Variables 49-55 may represent each day of the week. Variables 56-67 may represent a month in a year. Variables 68-90 may represent significant volume days, such as first day of a month, $15^{th}$ day of each month, etc. These days may correlate to when people get paid or would need extra cash, for example. Other variables may be implemented. Also, representative variables and/or other variations may be implemented.

Figure 7:
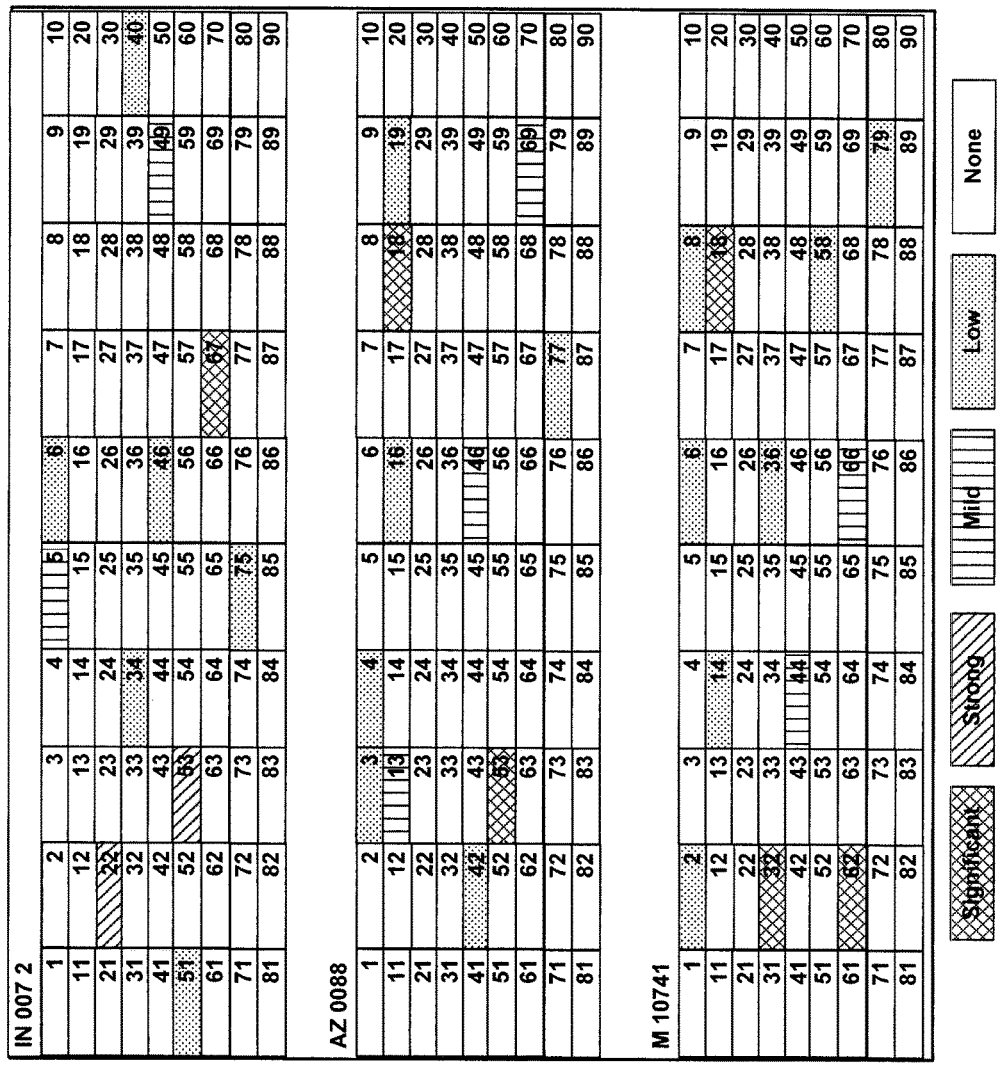
FIG. 7 is an exemplary illustration of predictor variable correlation, according to an embodiment of the present invention.

FIG. 7 is an exemplary illustration of predictor variable correlation, according to an embodiment of the present invention. FIG. 7 demonstrates the correlation between the predictor variables. The darker representation indicates a stronger correlation. For example, those variables with strong correlation (above 0.80) are identified as "Significant." Correlation values of 0.60-0.79 are identified as "Strong," correlation values of 0.40-0.59 are identified as "Mild," correlation values of 0.01-0.39 are identified as "Low" and correlation values of 0.00 are identified as "None." Other values and/or ranges may be applied.

Simulation may include withdraw simulation 214 and deposit simulation 216. An embodiment of the present invention may assign probabilities to unknown variables or values. Withdraw simulation may receive inputs from forecast uncertainty 220 and vendor arrival time uncertainty 222. Other sources of uncertainty may be received and applied. ATMs may have restrictions on when they can be serviced, for example.

Figure 8:
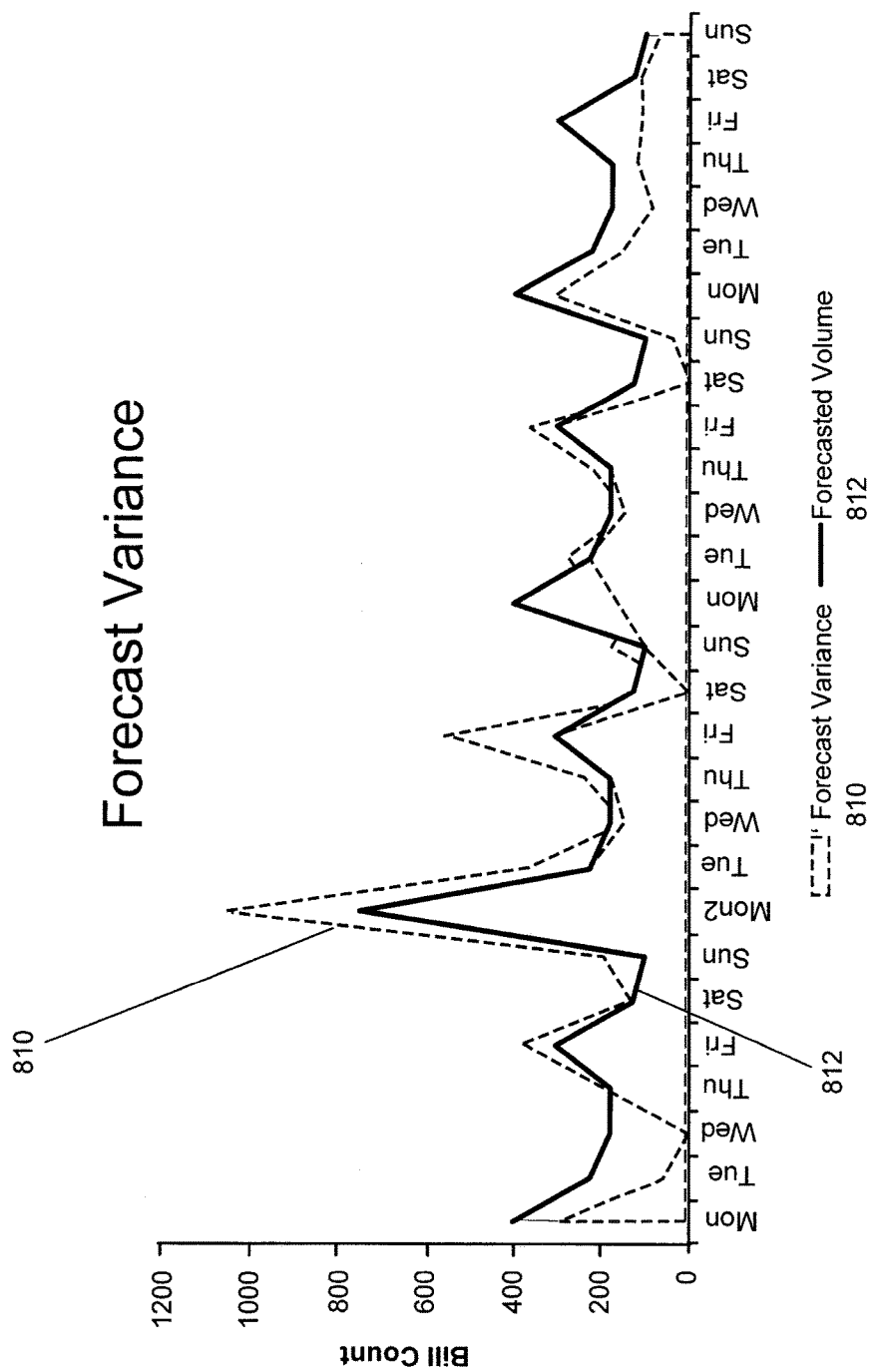
FIG. 8 is an exemplary illustration of a forecast variance, according to an embodiment of the present invention.

FIG. 8 is an exemplary illustration of a forecast variance, according to an embodiment of the present invention. In this illustration, the forecast volume 812 is compared to the actual volume 810 where the variance is represented by the space between 810 and 812. The variance represents the forecast uncertainty. FIG. 8 illustrates the bill count for each day of a particular exemplary month.

Deposit Simulation 216 may receive inputs from deposit bin capacity uncertainty 224, forecast uncertainty 226 and vendor arrival time uncertainty 228. Other sources of uncertainty may be received and applied. Based on withdraw simulation 214 and/or deposit simulation 216, fault risks may be generated for each ATM and/or group of ATMs. Also, service costs may be identified.

Figure 9:
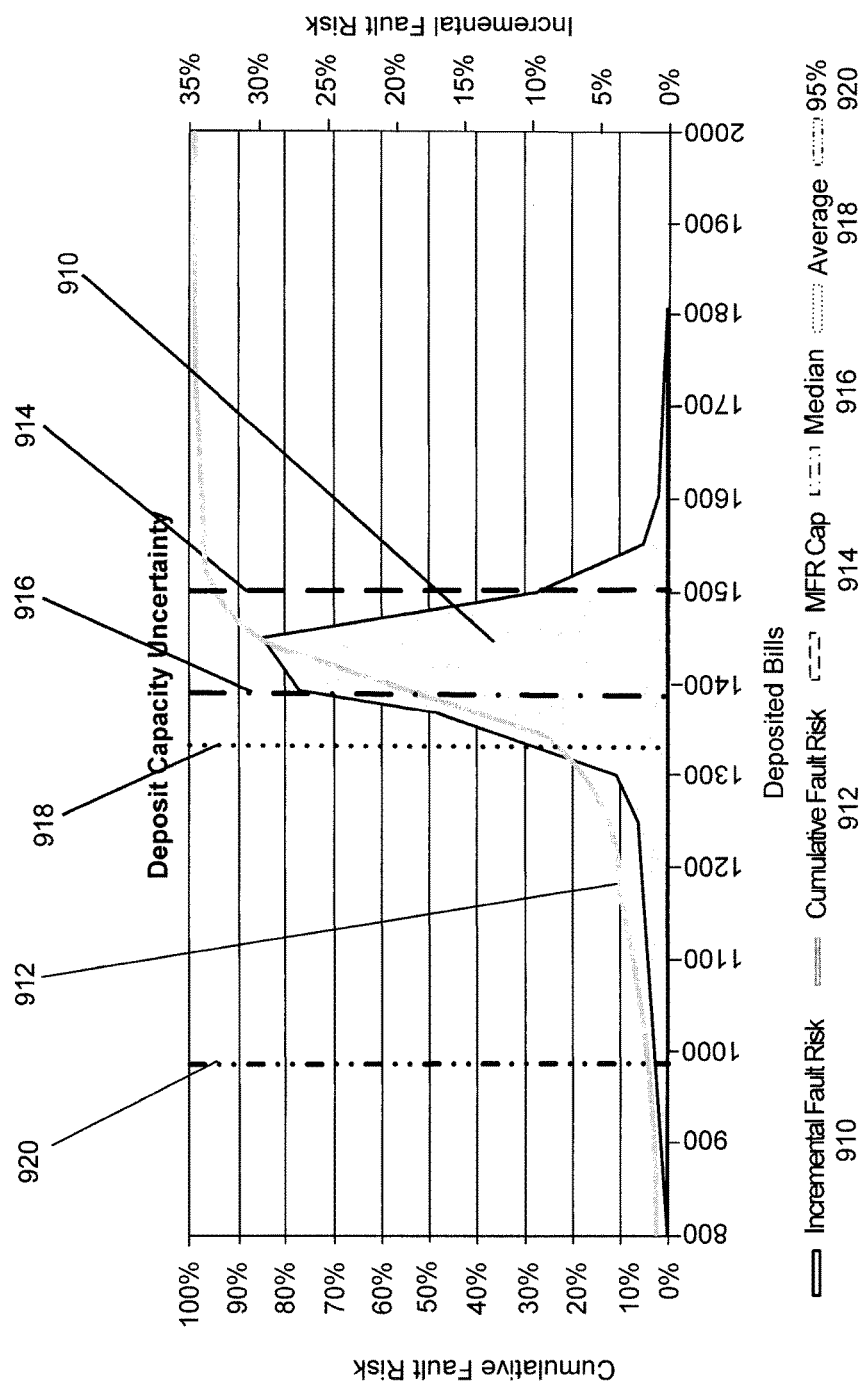
FIG. 9 is an exemplary illustration of deposit capacity uncertainty, according to an embodiment of the present invention.

FIG. 9 is an exemplary illustration of deposit capacity uncertainty, according to an embodiment of the present invention. FIG. 9 illustrates the amount of deposited bills as compared to a cumulative fault risk as shown along the left side, represented by percentages (from 0% to 100%). An incremental fault risk is illustrated along the right side, also represented by percentages (in this example, 0% to 35%). Incremental fault risk is graphically shown by 910. A cumulative fault risk is shown at 912. Manufacturer capacity is shown at 914. At 914, manufacturer stated capacity is not deemed useable. ATMs often provide inconsistent definitions of "capacity" across manufacturers. Median is represented by 914 and an average amount is represented by 918. Mean or median will under service approximately 50% of the time. Finally, 920 represents a 95% confidence interval where faults below the 5% level are disregarded. An embodiment of the present invention recognizes that using a simulation, such as a Monte Carlo simulation, rather than a static value for ATM capacity utilizes all or substantially all of the data on ATM performance in the field and quantifies and reflects how fault risk increases the higher the ATM bill count.

Figure 10:
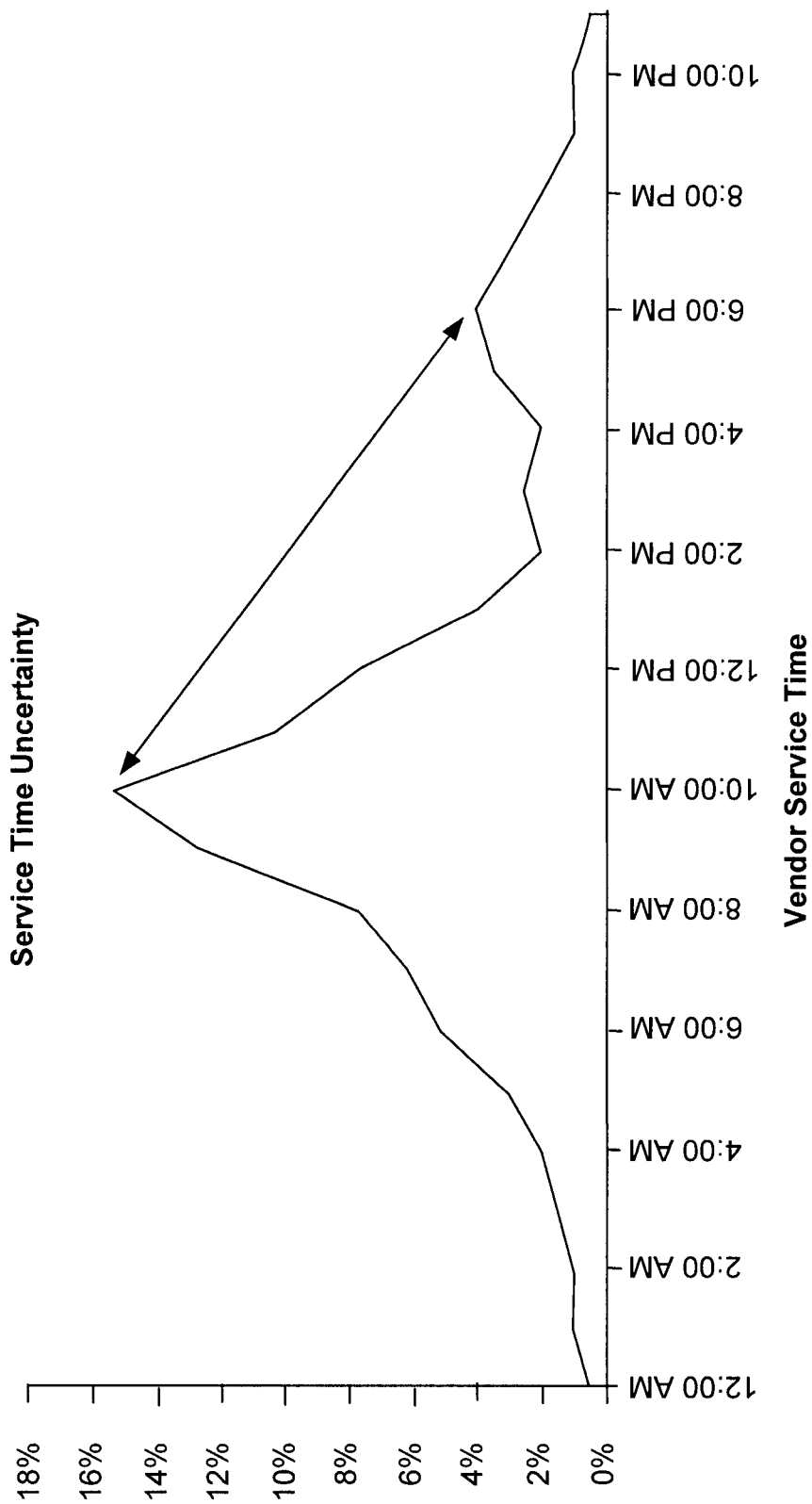
FIG. 10 is an exemplary illustration of service time uncertainty, according to an embodiment of the present invention.

FIG. 10 is an exemplary illustration of service time uncertainty, according to an embodiment of the present invention. FIG. 10 illustrates vendor service time for a 24 hour period illustrating vendor service time in terms of percentage. As shown in the illustration, service time is close to 16% at 10:00 am with the next highest service time is 6:00 pm. Service time uncertainty is an important factor to consider for high volume ATMs. Vendors vary their service routes for security reason.

Figure 11:
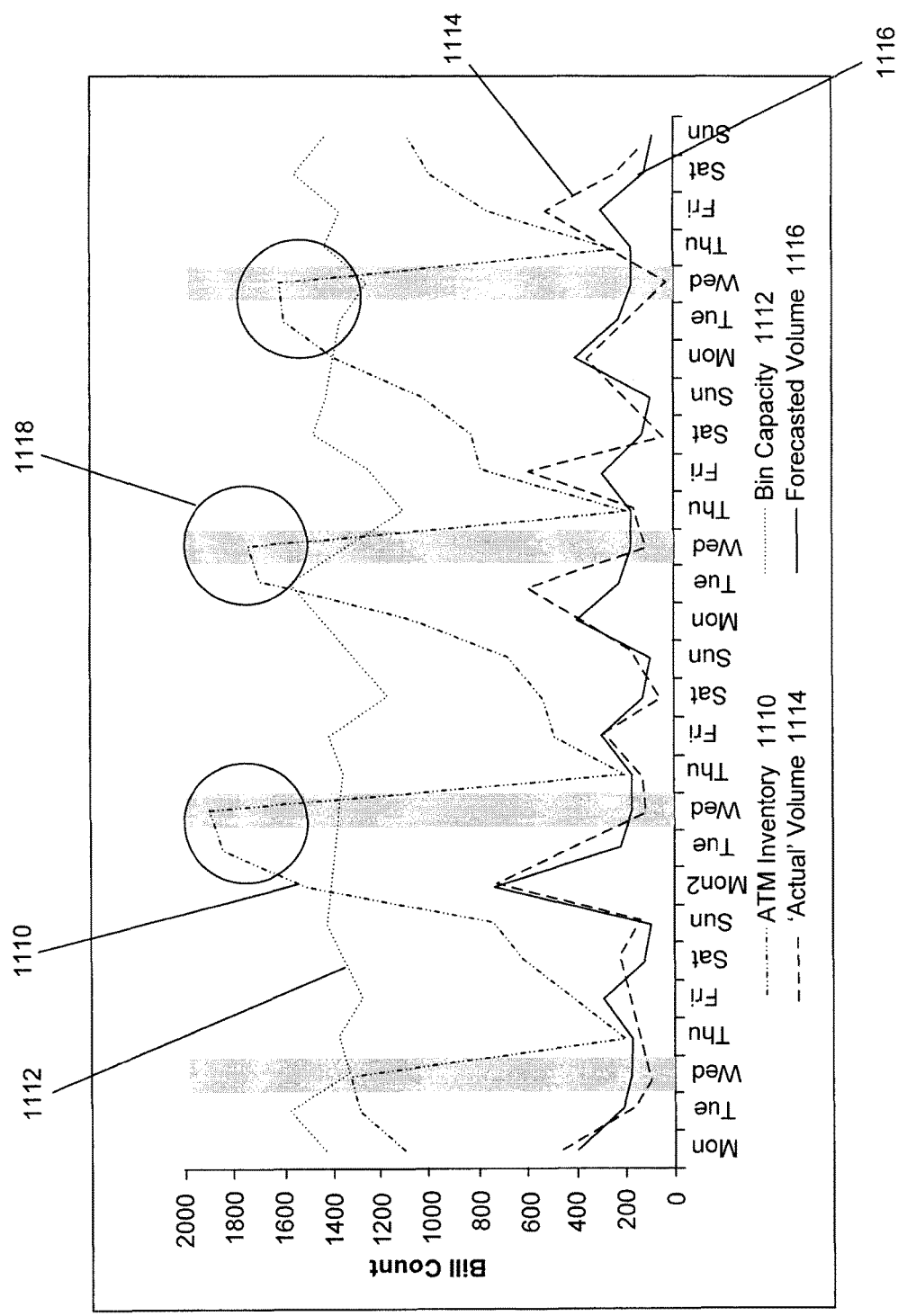
FIG. 11 is an exemplary illustration of a simulation example, according to an embodiment of the present invention.

FIG. 11 is an exemplary illustration of a simulation example, according to an embodiment of the present invention. In this illustration, a Monte Carlo simulation is demonstrated. ATM inventory is represented by 1110. Bin capacity is shown at 1112. Actual volume is illustrated by 1114 as compared to forecasted volume at 1116. FIG. 11 graphically illustrates forecast uncertainty (at 1114 and 1116); deposit bin uncertainty (at 1112) and service time uncertainty (at 1110). The area indicated at 1118 demonstrates a graphical representation of a fault occurrence. This is where cumulative ATM inventory exceeds the bin capacity. The intersection of ATM inventory and bin capacity occurs prior to the scheduled service date (indicated by the gray bar).

Figure 12A:
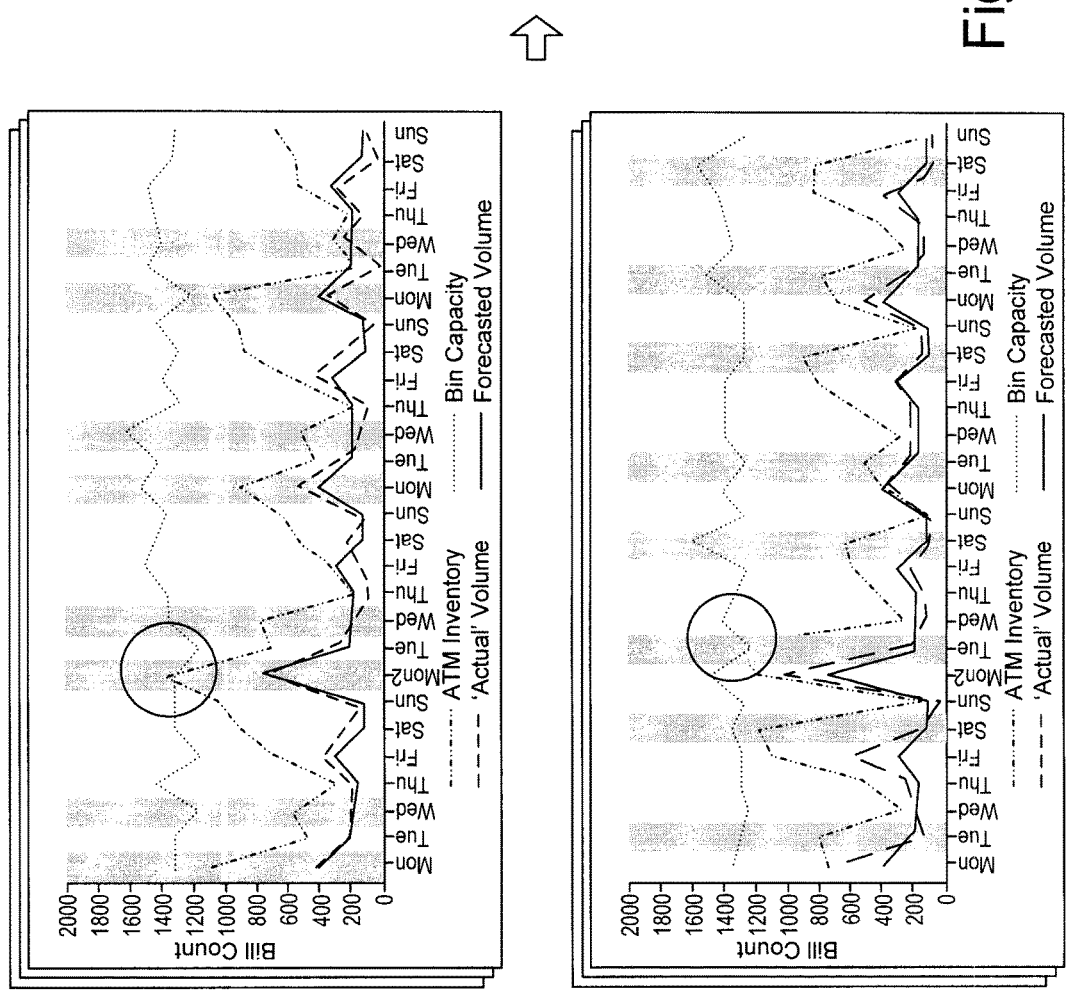
Figure 12B:
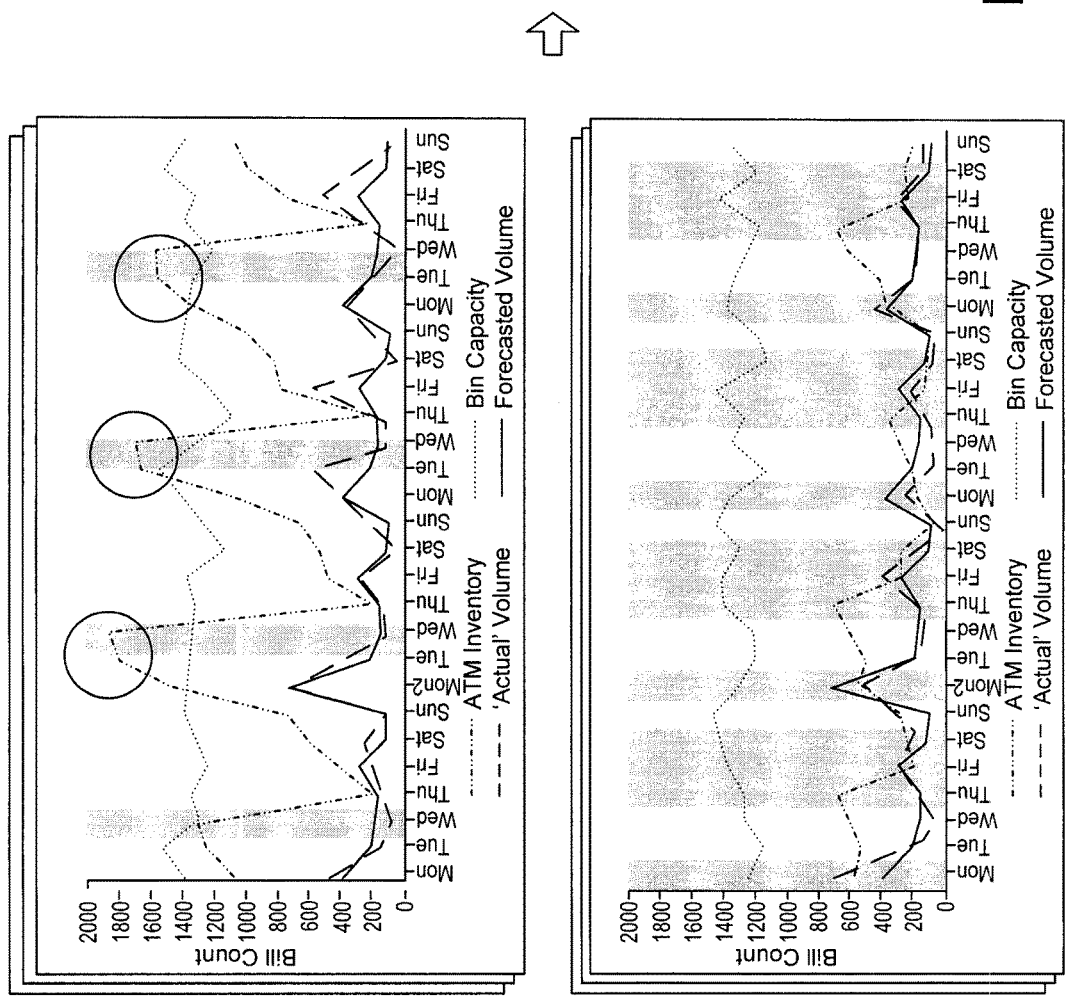

FIGS. 12A-C is an exemplary illustration of a simulation output, according to an embodiment of the present invention. FIGS. 12A-C illustrates a simulation of fault risk. FIGS. 12A and 12B illustrate simulations. In this example, 1,184,950,000 simulations are run. Possible deposit schedules may be represented by 128 unique combinations×500 simulations×6500 ATMs. Possible replenishment schedules may be represented by 169 unique combinations×500 simulations×9100 ATMs. The table shown in FIG. 12C demonstrates a sample of all possible service frequencies and their estimated number of faults per year.

As shown in FIG. 2, Decision Engine 218 may receive business rules 230 and generate recommended ATM service schedules 232. Business rules may relate to risk, cost containment factors, efficiencies, etc. An optimal schedule may be generated. For example, an embodiment of the present invention may identify a schedule with the lowest fault probability, risk and/or lowest cost. Other factors may be considered in determining the optimal output.

Figure 13:
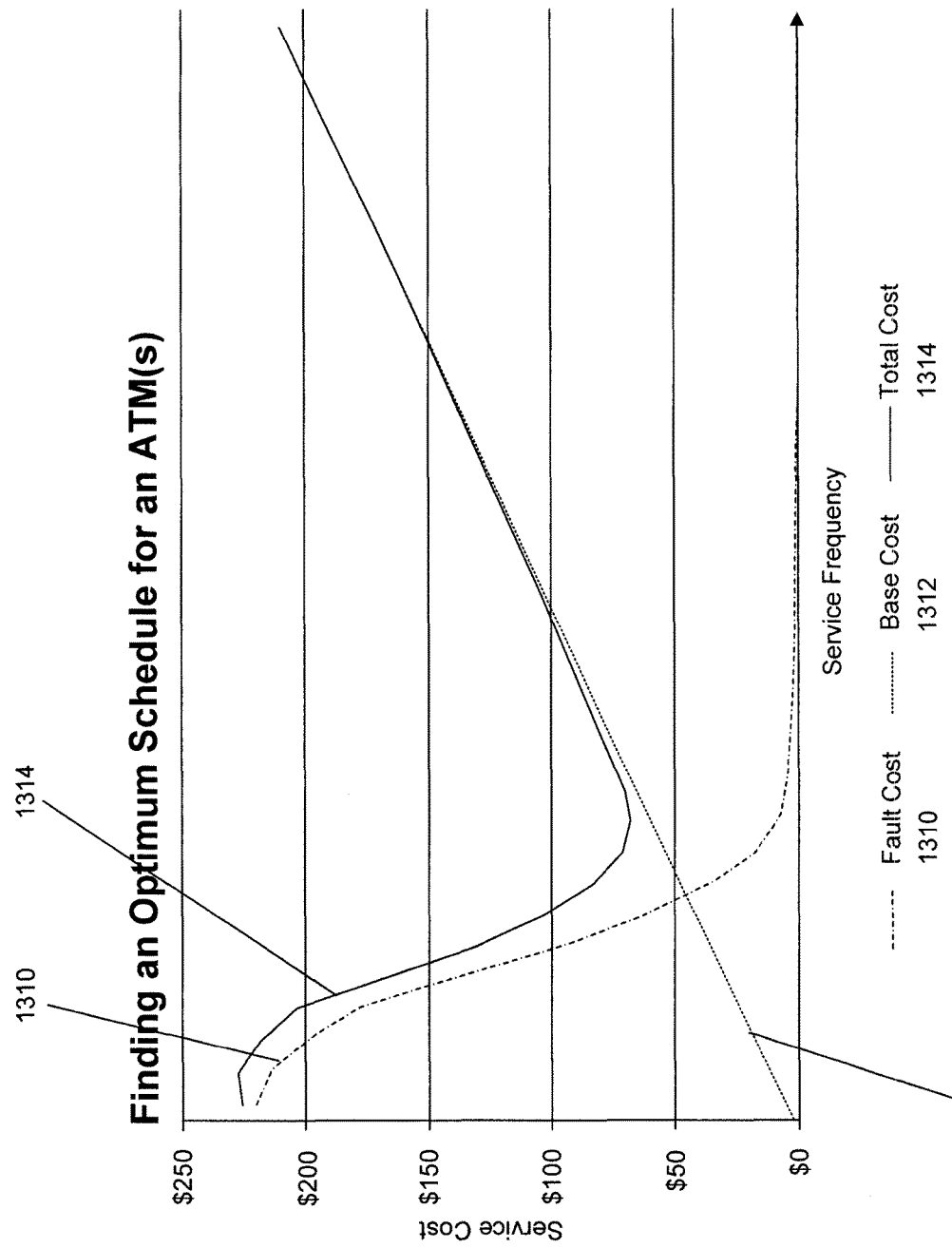
FIG. 13 is an exemplary illustration of determining an optimum schedule, according to an embodiment of the present invention.

FIG. 13 is an exemplary illustration of determining an optimum schedule, according to an embodiment of the present invention. An embodiment of the present invention finds an optimal schedule(s) for a single ATM and/or groups of ATMs. FIG. 13 illustrates service frequency as compared to service costs. In this example, 1310 represents fault cost, 1312 represents a base cost where 1314 represents a total cost.

FIG. 14 is an exemplary illustration of determining an optimum schedule, according to an embodiment of the present invention. Decision Engine may calculate the total cost of service for all possible deposit schedules (e.g., 128 combinations per ATM); all possible replenishment schedules (e.g., 169 combinations per ATM) and all possible combined schedules (e.g., 21,632 combinations per ATM). Optimized schedules may represent each ATM's unique strategy. Each ATM may implement a single optimized schedule or multiple schedules. Chart 1410 represents Deposit Total Cost, which may be calculated by multiplying Deposit Frequency (DF) and Deposit Pull Cost (DC) multiplied by 52 (representing 52 weeks). Chart 1412 represents Replenishment Total, which may be calculated by multiplying Replenishment Frequency (RF) and Replenishment Cost (RC) multiplied by 52 (representing 52 weeks). Chart 1414 represents Final Total Cost, which may be calculated by subtracting replenishment total cost from deposit total cost. Line entry 1420 in Chart 1410 and Line entry 1422 in Chart 1412 represent most optimized independent of other services. Line entry 1424 in Chart 1412 represents most optimized but not possible with supply chain. Line entry 1426 in Chart 1414 represents the most optimized ATM schedule. Optimization in this example may be determined by lowest cost. Other factors may be considered in other applications.

Figure 3:
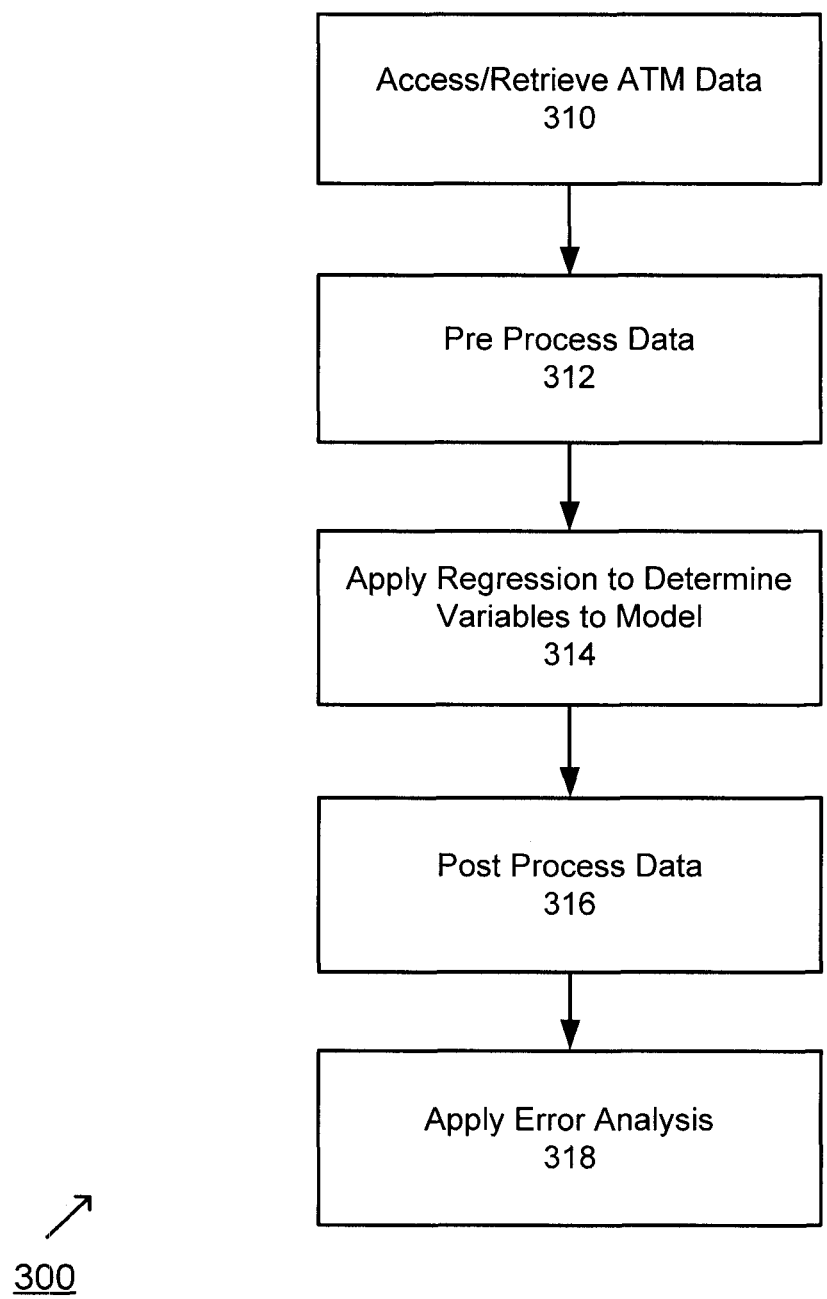
FIG. 3 is an exemplary flowchart illustrating a method for withdrawal forecast, according to an embodiment of the present invention.

FIG. 3 is an exemplary flowchart illustrating a method for withdrawal forecast, according to an embodiment of the present invention. At step 310, ATM data may be retrieved. At step 312, data may be preprocessed. At step 314, a regression model may be applied to determine a combination of variables to model. At step 316, a post processing of the data may be performed. At step 318, an error analysis may be applied. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

ATM Withdrawal Forecast Model forecasts total cash withdrawals from each individual ATM within a group, such as a vendor service fleet. The total cash withdrawals may be for a daily basis (or other time period/span). The forecast may then feed to a simulation, e.g., Monte Carlo Simulation, to determine best or optimal schedule recommendations, but may be used for other purposes as well. The model attempts to account for seasonality, holidays as well as proper cleansing of outliers in an automated fashion. The main procedure used to produce the forecasts may use a General Linear Model with variable selection techniques such as stepwise regression. Other models and techniques may be applied.

At step 310, ATM data may be retrieved. An embodiment of the present invention may utilize various sources of data, such as transaction data and ATM information. Other sources and types of data may be accessed. For example, data from a transaction level may be aggregated in sum to a daily level by ATM. The dataset "cashout" at location may be continually updated by ATM and transaction date with this data. The dataset "cashout" may contain withdrawal by ATM and by transaction date for Branch Serviced and Vendor Serviced ATMs. This data may be used for training data in the forecasts.

ATM information may include classification of the ATM using various fields, such as company name to determine if the ATM is Branch Service or Vendor Serviced. An embodiment of the present invention may include only vendor serviced ATMs. Another embodiment of the present invention may include vendor serviced ATMS, including branch and other ATMs for forecasting.

ATM data at one location may be used to forecast activity in another ATM. The ATM may be located down the street (e.g., close proximity, within a radius, etc.), or in another part of the country (e.g., similar demographic, city/county characteristics, etc.). Also, new ATMs or ATMs without access to historical data may use extrapolated data by analyzing data from similarly situated ATMs and/or ATMs of similar characteristics.

At step 312, data may be pre-processed. In the forecasting portion of the model for withdrawals, if there is a significant string of data that is identified to have withdrawal volume that is low, then data after that time period may be used in the regression model. Also, in order to have automation in dealing with outliers, the 1.5IQR (interquartile range) which may be defined as a numeric range between the first and third quartiles and multiplied by a factor of 1.5, may be calculated by a time period (e.g., weekday, etc.) for each ATM or group of ATMs. Other ranges and factors may be applied. For example, if any value is above the 3rd quartile by 1.5IQR then the value may be brought down to that upper bound so as to have an influence of high activity occurring on that day, but keeping it from being extreme. Likewise, any value below the 1.5IQR distance from the 1st Quartile may be brought up to that value for the same reason. Also, holidays and days next to (and/or beyond) holidays may be set to "missing" in the training dataset so that those days do not influence typical days. Holidays being forecasted may have a regular weekday forecast, but these days may then be brought up or down proportionally by how the same holiday performed in the previous year for that ATM (likewise for the days next to holidays).

Data pre-processing may identify new ATMs, add variables, determine maximum and minimum safety values, determine down ATMs, scrub outliers, define holidays, determine weekday averages, determine holiday effect, determine seasonality effects, determine ATMs with significant trends, soften seasonality and apply moving average. Other pre-processing actions may be performed as well.

For example, new ATMs may be determined based on the earliest day of activity with usage greater than a threshold amount, such as $500. If the earliest day is after the $15^{th}$ day of the $12^{th}$ month back then the ATM may be declared new. The logic behind this reasoning is so that ATMS with less than a full 12 months of history may have very bad seasonality estimates, particularly if an ATM only had ½ of a month of decent activity.

An embodiment of the present invention may define variables and add the variables to the model. The following is a list of exemplary variables:
1. Wkdy (Day of Week 1-7)
2. Wkdy2 (Day of Week 1,2,6,7: where 2 is Mon-Thurs)
3. Wk (week of month 1-4: where day(trandate)<9=1,else day(trandate)<16=2,else day(trandate)<22=3, else 4)
4. Fom (First of Month 0,1:if day(trandate)=1, else 0
5. Ff (First Friday of Month)
6. Pday1 (first, last, or middle day of the month 0,1)
7. Pday2 (same as pday1, but moves Saturdays to Fridays and Sundays to Mondays 0,1)
8. Pday3 (same as pday1 but moves both Saturdays and Sundays to Previous Friday 0,1)
9. Pdfa (alternate Fridays selected 0,1)
10. Pdfb (same as pdfa, but opposite Fridays)
11. Pdma (alternate Mondays selected 0,1)
12. Pdmb (same as pdma, but opposite Mondays)

Maximum and minimum safety values may be determined. For example, the maximum and minimum withdrawal volume by ATM and weekday may be determined. Safety values may be applied after forecasting to ensure no forecast is higher than the highest withdrawal volume observed in the past year, and no lower than the lowest withdrawal volume observed in the past year.

An embodiment of the present invention may also account for non-operating ATMs, including periods of inactivity, malfunction, compromise, etc. For example, ATMs with significant down time may be identified. This may be accomplished by identifying strings of transaction dates with withdrawal volume less than $500 (or other threshold amount). According to an exemplary scenario, any data prior to last "down string" may then be deleted.

An embodiment of the present invention may perform outlier scrubbing at predetermined intervals. For example, the first and third Quartile of Volume may be determined by ATM, weekday or other time period or factor. For example, using the 1.5 IQR rule, if any value is above the third quartile by weekday plus $1.5*(3^{rd}$ Quartile-$1^{st}$ Quartile) then that value may be flagged as an outlier and altered to the upper bound or lower bound accordingly for forecasting purposes.

An embodiment of the present invention may define holidays, events or other special days or time periods. For example, using a holiday function, dates for the following may be labeled as a holiday: New Years, Martin Luther King Jr, Memorial Day, Independence Day, Labor Day, Veteran's day, Thanksgiving, Christmas. Day before and Day after these holidays are also flagged. Any date within 1 day of a holiday may then set to "missing" for forecasting purposes. For some major holidays, any date within two or more days may be set to "missing." An embodiment of the present invention may also consider weather trends, inclement weather, natural disasters, power outages, etc. For example, a snow storm may not affect ATM activity situated in a major city whereas an ATM in a suburb may be completely shut down during the same storm.

An embodiment of the present invention may determine averages, such as weekday averages. Using the training dataset cleaned of outliers with holidays excluded, the average weekday by ATM volume may be calculated. This may be used to replace any forecasts found missing with this average. Also, weekday averages may be used to help calculate the holiday effect for each ATM or group of ATMs.

An embodiment of the present invention may determine holiday effects. For the identified holidays (and day(s) before and/or after), the ratio of the day relative to the average weekday volume may be calculated. This ratio may be multiplied by the original forecasts coming from a Generalized Linear Model ("GLM"). The GLM is a flexible generalization of ordinary linear regression that allows for response variables that have error distribution models other than a normal distribution. According to an exemplary application, a restriction may be set to not allow a ratio go above 10 (or other threshold). Therefore, restrictions can be placed on the model to limit the adjustment factors of a forecast to be within a defined threshold. Other restrictions may be applied.

An embodiment of the present invention may determine seasonality effects. For ATMs with at least 12 months of activity where each individual month has a minimum number of days of activity (e.g., 15 days), seasonality may be calculated. For each month, the average of the median and mean daily amount may be calculated (e.g., "lev"). The logic of using the median was to have some robustness that tempers the potential extreme values a mean could be susceptible to. For each ATM, the average of the 12 values ("lev") may then be calculated as the base. Each month may then be given a ratio as lev/base.

An embodiment of the present invention may determine ATMs with significant trends. For example, ATMs with seven consecutive months with 2% or more increase may be identified. These ATMS may have seasonality applied because if they are continually growing, the following month in the forecast would bring the forecast down when it needs to be brought up. Instead, these ATMs may have their training data brought down to the last 70 days, for example, for forecasting.

An embodiment of the present invention may soften seasonality. In order to prevent seasonality from over adjusting the forecast, the seasonality estimates may be "softened." For example, if a seasonality estimate was 0.9 meaning then forecast from the GLM may be brought down by 10% then the square root of 0.9 is taken to give 0.948, and the seasonality adjustment will be only a 5% reduction. Likewise, if the seasonality is greater than 1 say 1.1 or a 10% increase, then the $9^{th}$ root of the difference is taken to give 1.09 or a 9% increase.

An embodiment of the present invention may apply a moving average to the softened seasonality estimates. In order to avoid step functions of seasonality, a moving average of 10 (forward and backward) may be applied to softened seasonality estimates so that dates near the beginning or end of a month will have some influence of the seasonality of either the former or latter month respectively. Other variations and modifications may be applied.

At step 314, a regression may be applied to determine a combination of variables to model. Stepwise regression and cross validation with a number of blocks (e.g., 12 blocks) may be applied to determine a best or optimal combination of variables to model. The resulting sub models may be stored in a dataset for reference. A reason for this is to be able to obtain a statistic in an effort to identify super seasonal ATMS with very high autocorrelation. The statistic may be a test statistic used to detect the presence of autocorrelation (e.g., a relationship between values separated from each other by a given time lag) in the residuals (e.g., prediction errors) from a regression analysis.

At step 316, a post processing may be performed on the data. Forecasts may then be multiplied by their seasonality indexes to increase or decrease accordingly. Holidays may likewise have their forecasts multiplied by their respective holiday indexes Flat forecasts may be identified as those with a variance of 0 over a 7 day period. These ATMs may then have their forecast replaced with the average weekday mean.

Post processing may include making appropriate adjustments. For example, any forecast higher than the maximum weekday volume may be reset to the maximum weekday volume. Likewise, any forecasts lower than the minimum may be reset to the minimum. Any forecast that is missing or negative may be reset to the average weekday volume. Adjustments may be counted and monitored to ensure that there is not a high volume of ATMs over written.

At step 318, an error analysis may be applied. For example, data from Oct. 1 2011 to Oct. 16 2012 may be used to predict all of November 2012 and likewise Jan. 1 2012 through Jan. 16 2013 was used to predict all of February 2013. These months may be chosen due to the limitation in data available and still desiring to get a feel for how the model would perform at different times of the year with at least a full year of data to always forecast. Many direct comparisons may be done to compare the addition of techniques and make a judgment based on the Mean absolute percent error (MAPE) as well as Median Absolute Percent Error. In this way, some of the values may be compared to other values (like the softening factor of seasonality or the threshold of declaring values to be outliers).

In addition to comparing individual models one step at a time, models may also be compared to a 10 week (or other time period) weekday average to ensure that the new model was significantly better than a "super simplified model."

Other alternative models may be implemented, such as ARIMA, GLM. Other models that are able to forecast out as far as 90 days, for example, may be implemented in accordance with the embodiments of the present invention. Also, a model that does not try to over trend volumes may be applied given that the date itself is not a variable in the model.

After determining best steps, techniques and parameter settings, further analysis may be on-going to classify ATMs and determine certain techniques that help certain groups of ATMs but not others. Accordingly, different models may be applied to ATMs that are pre-classified. An example of this may be a statistic as produced in the GLM procedure. If an ATM has a very high statistic (e.g., meaning high autocorrelation) this might suggest a super-seasonal ATM like an ATM at the Grand Canyon that may have very high (step volume) activity from April to September and that drops off significantly from October to March. Therefore, this particular ATM may require different modeling techniques than the general ATMS to be explored.

An embodiment of the present invention is directed to a method for deposit volume forecast. The steps may correspond to FIG. 3. While the process of FIG. 3 represents certain steps performed in a particular order, it should be understood that the embodiments of the present invention may be practiced by adding one or more steps to the processes, omitting steps within the processes and/or altering the order in which one or more steps are performed. These steps will be described in greater detail below.

For deposit forecasting, data cleansing may involve eliminating known days where there was a "Deposit Bin Full" ticket suggesting a difference in normal activity may have occurred. An increase may be applied. For example, a 5% boost (or other percentage or amount) may be given to days greater than the 4th of the month and less than the 2nd to last day of month. This date range identifies normal daily activity whereas the first four days and the last two days of the month represent increased volume days. This methodology is based on realization in testing for different months that trending was not well accounted for and this number tested to be optimal for February 2013-July 2013 with 3 separate holdout tests.

Deposit Forecast: Input: Billcounts by ATM by day from Base24 data (joining tables LDA_BASE24_TXNS_ATLFBASE_DAILY and LDA_BASE24_TXNS_ATLFBASE_DAILY)

The following exemplary assumptions may be applied: Recent weekday activity of an ATM is reflective of what the weekday activity will be over the next two months. "Beginning of the month" and "End of the month" time periods have slightly different patterns than mid-month weekday activity.

1) Median for days of a month may be the last 2 days of the month or the first 4 days of the month (e.g., EOM/BOM timeframe). In this example, only prior activity relative to that part or the month may be used to determine forecast.

2) Similarly, only days outside of EOM/BOM time frame may be used to forecast the non EOM/BOM time frame.

3) For the EOM/BOM time frame, a mid-quartile by weekday and mean by weekday may be averaged to be the forecast where the mid-quartile is based off EOM/BOM time frame for the past 52 weeks and the mean may be based on the past 24 weeks, for example.

4) Similarly, the non EOM/BOM timeframe may be derived using non EOM/BOM timeframe and only 12 weeks to drive the mean, for example.

5) Boost may be applied to a non EOM/BOM time frame upon observation that this method has a consistent bias over multiple months of about 5% found improved results overall experimenting with various values.

Figure 4:
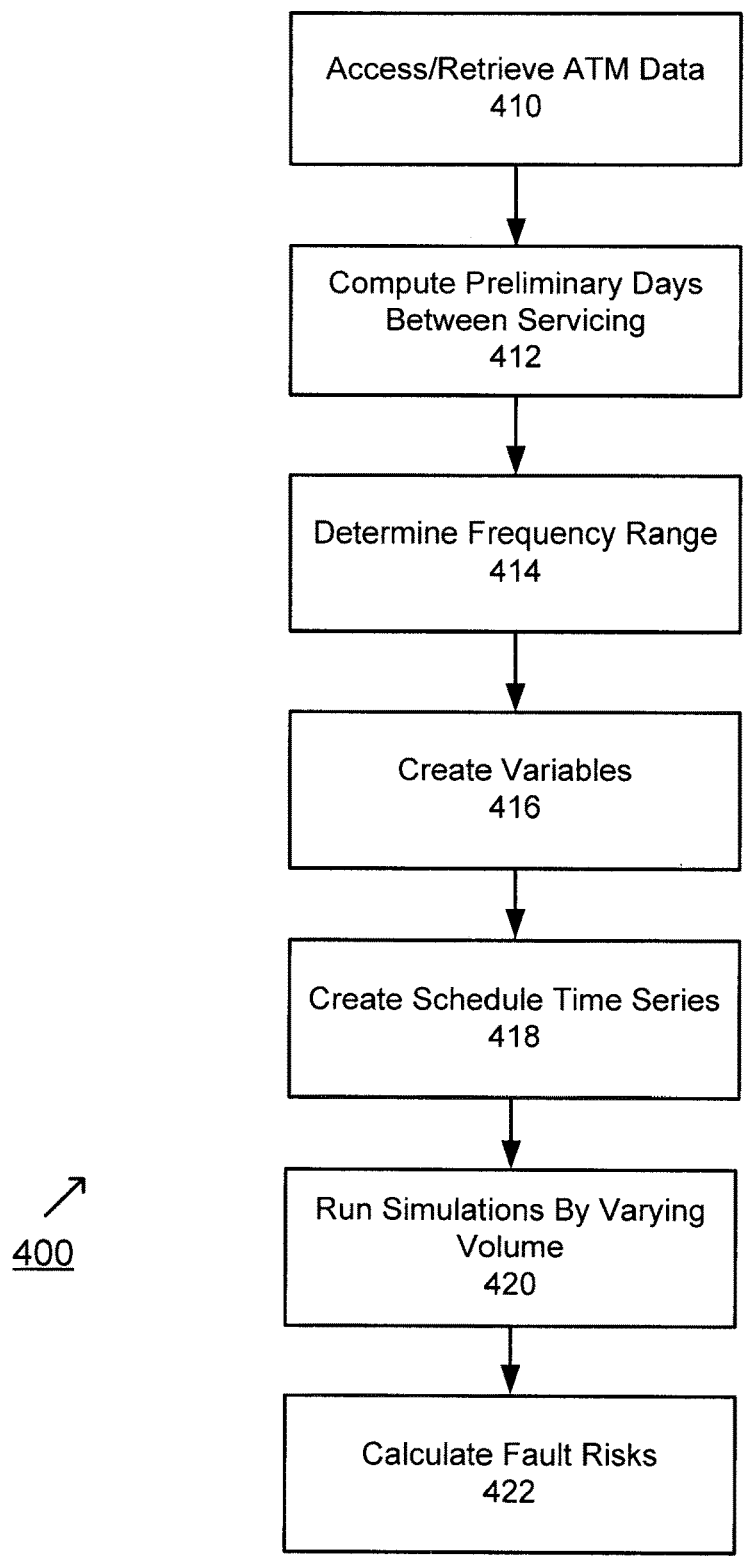
FIG. 4 is an exemplary flowchart illustrating a method for withdrawal simulation, according to an embodiment of the present invention.

FIG. 4 is an exemplary flowchart illustrating a method for withdrawal simulation, according to an embodiment of the present invention. At step 410, ATM profiles may be retrieved. At step 412, preliminary days between servicing may be computed. At step 414, frequency range may be determined. At step 416, variables may be created. At step 418, time series schedules may be created. At step 420, simulations may be executed by varying volume. At step 422, fault risks may be calculated. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

Withdrawal simulation may include a simulation, such as a Monte Carlo Simulation that incorporates the forecast results with other uncertain variables in the business environment to assess a "fault risk" for each Vendor Serviced ATM's candidate service schedules. Separate but similar processes may be applied for withdrawals and deposits.

At step 410, ATM profiles may be retrieved. Inputs to withdrawals may include ATM profiles, withdrawals forecast, a file containing 128 (2^7) possible weekly schedules, and a file with 43 possible bi-weekly and monthly schedules. The profiles file may be read to determine ATM capacities. Missing capacities may be set to an average ATM capacity number, such 160,000 or other predetermined value which may be further customized based on geographic data, ATM characteristic, seasonal data, etc. An overall mean of the means may be computed by ATM.

At step 412, preliminary days between servicing may be identified. A preliminary days between servicing may be computed for up to 60 days, for example, based on a safety stock calculation using the historical daily standard deviation and mean demand. The days between servicing may be translated into weekly frequency ranges to be used in the simulation.

At step 414, a frequency range may be determined. Additionally, the current frequency may be used to ensure the current schedule is tested in the Monte Carlo simulation, for example. Exemplary frequencies range may include 7 (daily) to 1 (weekly), 0.5 (bi-weekly), and 0.25 (monthly). Other ranges and values may be used.

At step 416, variables may be created. The dataset with the possible schedules may be input and 828 (128 schedules*7 days of week) variables may be created indicating each schedule and the day of week for servicing. For example, the variables may be binary indicators for each combination of schedule number and day of the week. A "1" indicates that there is a scheduled service on that day for that schedule, otherwise it is zero. The source table may include the schedule numbers in rows and the days of week as columns. This step may simply extend all of these entries into a single row.

At step 418, time series schedules may be created. This dataset may be used to create a time-series schedule by ATM starting a predetermined number of days (e.g., 60 days) before the current date and continuing a predetermined number of days (e.g., 80 days) after the current date. For each date, there may be 128 columns indicating whether or not a servicing occurs for that schedule on that date. For the bi-weekly and monthly schedules, a similar process may be used with the result being dates with 43 possible bi-weekly and monthly schedules for each date for each week.

At step 420, simulations may be executed by varying volume. An exemplary simulation may assume that each ATM starts with empty amounts. By starting 60 days before the current date, the starting point of the analysis (e.g., the current date) may have various amounts already withdrawn from each ATM. The standard deviation for each day may be computed from the daily upper bound and confidence interval. For example, the simulation may be conducted for 500 runs where today's volume is varied by run based on this equation:

todayvolume=max(0,round(rand("Normal",forecast expected withdrawals,std),1)).

At step 422, fault risks may be calculated. An embodiment of the present invention may also select when the servicing will occur during the day (e.g., if a servicing should occur) based on a random uniform distribution between 0.25 and 0.75. This may be done for each of the possible schedules considered. Faults may be calculated for the day when the cumulative amount withdrawn from the machine before servicing equals 0 or goes negative. An embodiment of the present invention may assume an emergency trip may be made by the vendor. The average number of faults per day may be calculated for each schedule.

Deposits simulations may be performed in a similar manner, as described above in FIG. 4. Some modifications may apply. For deposits, an embodiment of the present invention may be applied at least once per week, so bi-weekly and monthly schedules may not be considered. Additional inputs may come from files directed to actual deposit bin capacity versus the manufacturer's stated capacity. Capacity probability distributions may be used for certain ATM types. If capacity is unknown, it may be set to a predetermined capacity (or range), such as 1,350, for example. The preliminary days between servicing may be computed for 7 days and the weekly frequencies range from 7 to 1. In each Monte Carlo run, the bin size for certain ATM types may be selected based on a uniform distribution of the capacity. The fault may occur when the cumulative deposits in the machine exceeds the capacity.

According to an embodiment of the present invention, a decision engine may evaluate the service costs and fault risks of each candidate schedule and choose an optimum new schedule.

Figure 5:
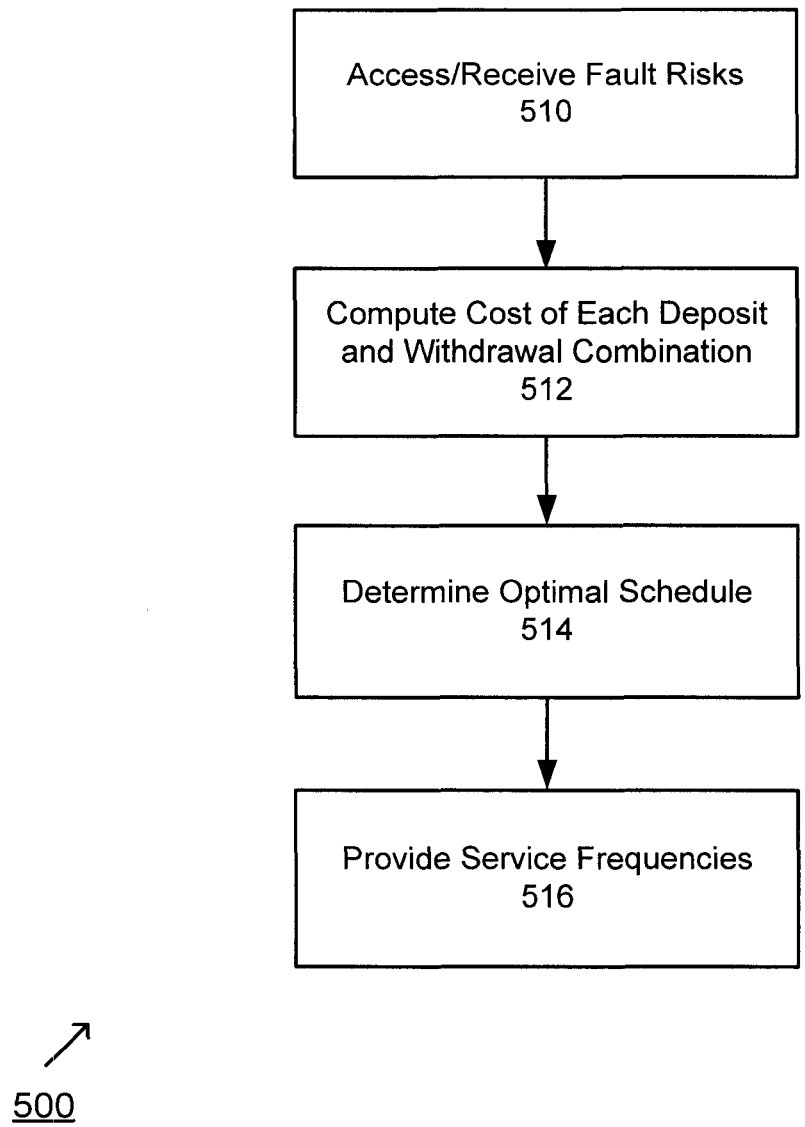
FIG. 5 is an exemplary flowchart illustrating a method for determining an optimal schedule using a decision engine, according to an embodiment of the present invention.

FIG. 5 is an exemplary flowchart illustrating a method for determining an optimal schedule using a decision engine, according to an embodiment of the present invention. At step 510, fault risks or probabilities may be received. At step 512, costs for each deposit and withdrawal combinations may be computed. At step 514, an optimal schedule may be determined. At step 516, service frequencies may be provided. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 510, fault risks or probabilities may be received. The Decision Engine may use the fault probabilities from the Monte Carlo simulation, ATMs servicing costs, fault multipliers representing good will costs, and the ATM profiles dataset, for example.

At step 512, costs for each deposit and withdrawal combination may be computed. An embodiment of the present invention may compute the weekly cost of each deposit and withdrawal combination based on the costs of each and a discount for doing both a replenishment and deposit servicing at the same time. According to this example, this produces 21,632 schedule combinations (128 deposits*169 withdrawals). For new ATMs becoming active in the past 180 days, the current schedule may be used if there is not a mature ATM with the same capacity at its location. If there are mature ATMs with the same capacity, the one with the most frequent schedule may be used. For ATMs older than three months, for each schedule combination tested in the Monte Carlo simulation, total cost per week may be computed as follows:

TotalCost=(RepRisk*&cost_emergency_run*7* &with$d$_multiplier)+(DepRisk*&cost_emergency_run* 7*&dep_multiplier)+ScheduledCost.

In this example, RepRisk represents average daily probability of an out-of-cash fault on a given schedule determined from the situation. Cost_Emergency_Run represents constant representing the cost to send a vendor to service a machine on a non-scheduled day. Withd_multiplier represents a value selected to assign a monetary penalty for an out-of-cash event; higher values equate to a greater degree of aversion to faults. DepRisk represents average daily probability of a deposit-bin-full fault on a given schedule determined from the simulation. Dep_multiplier represents a value selected to assign a monetary penalty for a deposit-bin-full even; higher values equate to a greater degree of aversion to faults. ScheduledCost represents the weekly cost to send a vendor to service a machine on a given combination of withdrawal and deposit schedules, determined from the days sent for each type of service and the discount for performing both services at the same time.

At step 514, an optimal schedule may be determined. If the current schedule being evaluated is the lowest cost or tied for lowest cost, it may be retained as the best schedule. Decision logic around recommending one schedule out of schedules with the same cost may start with matching both the current deposit and current withdrawal schedule. An embodiment of the present invention may then choose a match of the current deposit and a schedule for withdrawals on the same day of week but a different frequency. An embodiment of the present invention may then look for the current withdrawals schedule or current withdrawals day of week but of different frequency. An embodiment of the present invention may prioritize withdrawals because it is more costly to change than deposits.

An exemplary tie-breaker may be based on the current deposit schedule. After that, an embodiment of the present invention may look for schedules that avoid Friday, Saturday, and Sunday. Next, the prohibition on Saturday may be relaxed. Then, the prohibition on Friday may be relaxed. Any remaining schedules are then retained, which should be schedules that include a Sunday. If an ATM does not accept deposits, an embodiment of the present invention may follow similar logic but not consider the deposit pull schedules.

An embodiment of the present invention may also incorporate and/or forecast location based events (e.g., sports, conventions, etc.) that could potentially drive ATM volume. These ATM's will have higher error rates (thus higher uncertainties) during event periods. It may be assumed that the historical event periods correspond to those in the ATM's forecast period, and the ATM will then be decisioned more conservatively as a result.

Monte Carlo segment of the model is stochastic in nature. It is possible for an ATM to show a high level of risk on a schedule that is truly satisfactory due to "luck" alone. Also, it is possible for an ATM to show low-risk on a schedule that is a poor choice in reality. This possibility becomes more remote as model iterations (and runtime) increases.

At step 516, service frequencies may be provided. Model's outputs may include deposit and replenishment service frequencies and day of week recommendations for each vendor serviced ATM in the fleet.

The regression and simulation segments of the model are purely analytical evaluations and no effort is made to make them either aggressive or conservative. Their aim is to provide a clear representation of risks associated with candidate ATM service schedules. The LOB determines the model's decision conservatism by providing the business rules that will be used as part of the "Decision Engine" segment of the model. These business rules are currently under development. There's a little bit of conservatism since we truncate any negative values to 0. You might say this overestimates demand.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Processor 110 may be stored and cataloged in Databases 140, 142, 144 and 146 which may comprise or interface with a searchable database. Database s 140, 142, 144 and 146 may comprise, include or interface to a relational database. Other databases, such as a query format database, a Standard Query Language (SQL) format database, a storage area network (SAN), or another similar data storage device, query format, platform or resource may be used. Databases 140, 142, 144 and 146 may represent a single database or a collection of databases, dedicated or otherwise. In one embodiment, Databases 140, 142, 144 and 146 may store or cooperate with other databases to store the various data and information described herein. In some embodiments, Databases 140, 142, 144 and 146 may comprise a file management system, program or application for storing and maintaining data and information used or generated by the various features and functions of the systems and methods described herein. In some embodiments, Databases 140, 142, 144 and 146 may store, maintain and permit access to participant information, transaction information, account information, and general information used to process transactions as described herein. In some embodiments, Databases 140, 142, 144 and 146 is connected directly to Processor 110, which, in some embodiments, it is accessible through a network, such as communication network, e.g., 122, 124 illustrated in FIG. 1, for example.

Communications network, e.g., 122, 124, may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network, e.g., 122, 124, may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 122, 124, may comprise a satellite communications network, such as a direct broadcast communication system (DBS) having the requisite number of dishes, satellites and transmitter/receiver boxes, for example. Communications network, e.g., 122, 124, may also comprise a telephone communications network, such as the Public Switched Telephone Network (PSTN). In another embodiment, communication network 120 may comprise a Personal Branch Exchange (PBX), which may further connect to the PSTN.

In some embodiments, Processor 110 may include any terminal (e.g., a typical home or personal computer system, telephone, personal digital assistant (PDA) or other like device) whereby a user may interact with a network, such as communications network, e.g., 122, 124, for example, that is responsible for transmitting and delivering data and information used by the various systems and methods described herein. Processor 110 may include, for instance, a personal or laptop computer, a telephone, or PDA. Processor 110 may include a microprocessor, a microcontroller or other general or special purpose device operating under programmed control. Processor 110 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor 110 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor 110 may also include a network-enabled appliance, a browser-equipped or other network-enabled cellular telephone, or another TCP/IP client or other device.

As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to, provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizes, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. An automated computer implemented method for determining and implementing an optimized schedule for deposit pickup, cash replenishment, and service timing for one or more ATM devices, wherein the method is executed by a programmed computer processor which communicates with a user via a network, the method comprising the steps of:
   executing, via the computer processor, a volume forecast determination for at least one ATM device to generate forecast data, wherein the volume forecast comprises a withdrawal forecast and a deposit forecast, and where the withdrawal forecast and deposit forecast utilize distinct methodologies;
   executing, via the computer processor, a simulation based on the forecast data to develop a plurality of possible ATM schedules for the at least one ATM, each of the plurality of possible ATM schedules comprises a replenishment schedule, a deposit schedule and a total cost associated with servicing each of the plurality of possible ATM schedules, wherein the simulation considers one or more identified uncertainties and wherein the simulation comprises a withdrawal simulation and a deposit simulation, the withdrawal simulation is based on forecast uncertainty and vendor arrival time uncertainty and the deposit simulation is based on deposit bin capacity uncertainty, forecast uncertainty and vendor arrival time uncertainty;
   automatically, via the computer processor, generating one or more fault risks for each of the plurality of possible ATM schedules based at least in part on the one or more identified uncertainties, the one or more fault risks comprises a cumulative fault risk and an incremental fault risk;
   automatically, via the computer processor, determining an optimal schedule for the at least one ATM device based on the one or more fault risks; and
   initiating, via the computer processor, the optimal schedule for the at least one ATM based on the one or more fault risks.

2. The method of claim 1, wherein the simulation comprises a Monte Carlo simulation.

3. The method of claim 1, wherein the volume forecast is based on a regression model applied to historic ATM volume data.

4. The method of claim 1, wherein the volume forecast considers one or more seasonal factors.

5. The method of claim 1, wherein the step of determining an optimal schedule further comprises computing cost of a plurality of deposit and withdrawal combinations.

6. The method of claim 1, wherein the optimal schedule further comprises a service frequency.

7. The method of claim 1, wherein the optimal schedule is further based on one or more business rules.

8. The method of claim 1, wherein the at least one ATM device comprises a plurality of ATMs in one or more geographic locations.

9. A system that determines an optimization schedule for one or more ATM devices, wherein the system comprises a programmed computer processor which communicates with a user via a network, comprising:
   a processor; and
   a memory comprising computer-readable instructions which when executed by the processor cause the processor to perform the steps comprising:
   executing a volume forecast determination for at least one ATM device to generate forecast data, wherein the volume forecast comprises a withdrawal forecast and a deposit forecast, and where the withdrawal forecast and deposit forecast utilize distinct methodologies;
   executing a simulation based on the forecast data to develop a plurality of possible ATM schedules for a specific ATM, each of the plurality of possible ATM schedules comprises a replenishment schedule, a deposit schedule and a total cost associated with servicing each of the plurality of possible ATM schedules, wherein the simulation considers one or more identified uncertainties and wherein the simulation comprises a withdrawal simulation and a deposit simulation, the withdrawal simulation is based on forecast uncertainty and vendor arrival time uncertainty and the deposit simulation is based on deposit bin capacity uncertainty, forecast uncertainty and vendor arrival time uncertainty;
   automatically generating one or more fault risks for each of the plurality of possible ATM schedules based at least in part on the one or more identified uncertainties, the one or more fault risks comprises a cumulative fault risk and an incremental fault risk;

automatically determining an optimal schedule for the at least one ATM device based on the one or more fault risks; and initiating, via the computer processor, the optimal schedule for the at least one ATM based on the one or more fault risks.

10. The system of claim 9, wherein the simulation comprises a Monte Carlo simulation.

11. The system of claim 9, wherein the volume forecast is based on a regression model applied to historic ATM volume data.

12. The system of claim 9, wherein the volume forecast considers one or more seasonal factors.

13. The system of claim 9, wherein determining an optimal schedule further comprises computing cost of a plurality of deposit and withdrawal combinations.

14. The system of claim 9, wherein the optimal schedule further comprises a service frequency.

15. The system of claim 9, wherein the optimal schedule is further based on one or more business rules.

16. The system of claim 9, wherein the at least one ATM device comprises a plurality of ATMs in one or more geographic locations.

* * * * *